United States Patent [19]

Koyama

[11] Patent Number: 5,159,539
[45] Date of Patent: Oct. 27, 1992

[54] HIGH FREQUENCY DC/AC POWER CONVERTING APPARATUS

[75] Inventor: Masato Koyama, Amagasaki, Japan

[73] Assignee: Mitsubishi Denki Kabushiki Kaisha, Tokyo, Japan

[21] Appl. No.: 870,233

[22] Filed: Apr. 20, 1992

Related U.S. Application Data

[63] Continuation of Ser. No. 567,234, Aug. 14, 1990.

[30] Foreign Application Priority Data

Aug. 17, 1989 [JP] Japan ................... 1-211737
Mar. 28, 1990 [JP] Japan ................... 2-79627

[51] Int. Cl.⁵ ........................... H02M 5/22
[52] U.S. Cl. ........................... 363/8; 363/10; 363/159
[58] Field of Search ........... 363/2, 8, 10, 159, 160, 363/161, 163

[56] References Cited

U.S. PATENT DOCUMENTS

| | | | |
|---|---|---|---|
| 3,487,289 | 12/1969 | McMurray | 363/161 |
| 3,742,336 | 6/1973 | Bedford | 363/8 |
| 4,479,175 | 10/1984 | Gille et al. | 363/159 |
| 4,556,937 | 12/1985 | Ziogas et al. | 363/8 |
| 4,639,850 | 1/1987 | Asaeda et al. | 363/58 |
| 4,652,770 | 3/1987 | Kumano | 307/66 |
| 4,677,537 | 6/1987 | Chonan | 363/126 |
| 4,706,178 | 11/1987 | Hayashi | 363/8 |
| 4,847,744 | 7/1989 | Araki | 363/49 |
| 4,855,887 | 8/1989 | Yamato et al. | 363/8 |
| 4,878,163 | 10/1989 | Yamato et al. | 363/160 |
| 4,969,080 | 11/1990 | Kawabata et al. | 363/41 |

OTHER PUBLICATIONS

Yamato et al., "New Conversion System For UPS Using High Frequency Link", Apr. 1988, pp. 658–663, IEEE PESC.

Primary Examiner—Steven L. Stephan
Assistant Examiner—Jeffrey Sterrett
Attorney, Agent, or Firm—Leydig, Voit & Mayer

[57] ABSTRACT

A DC-to-AC electric power converting apparatus includes: an inverter circuit for converting DC electric power into AC electric power; a transformer connected to the inverter circuit; a cyclo-converter circuit for converting the frequency of the output from the transformer; a carrier signal generator for generating a carrier signal of a predetermined frequency; an inverter switching circuit for generating a signal for controlling the inverter circuit in synchronization with the carrier signal; a reference voltage signal generating circuit for generating a reference signal for the AC voltage to be transmitted from the cyclo-converter circuit; a first switching signal generating circuit for generating a switching signal in accordance with the reference voltage signal supplied from the reference voltage signal generating circuit and the carrier signal supplied from the carrier signal generator; and a cyclo-converter switching circuit for generating a signal for controlling the cyclo-converter circuit in accordance with the switching signal supplied from the first switching signal generating circuit.

9 Claims, 19 Drawing Sheets

HIGH FREQUENCY DC/AC POWER CONVERTING APPARATUS

This application is a continuation of application Ser. No. 07/567,234, filed Aug. 14, 1990.

BACKGROUND OF THE INVENTION

1. Field of the Invention

The present invention relates to a DC-to-AC electric power converting apparatus for use in an AC power supply system such as an uninterruptive power supply system. More particularly, the present invention relates to an electric power converting apparatus of a high frequency intermediate link system in which high frequency electric power is transmitted/received via an insulating transformer.

2. Description of the Related Art

The structure of a conventional apparatus will be described with reference to FIG. 17. FIG. 17 is a block diagram of a conventional DC-to Ac power converting apparatus as disclosed in IEEE PESC '88 Record, pp658–663, 1988. Referring to the drawing, reference numeral 1 represents an inverter circuit, 2 represents a transformer the input of which is connected to the inverter circuit 1 and 3 represents a cyclo-converter circuit connected to the output of the transformer 2. Reference numeral 4 represents a filter circuit connected to the output of the cyclo-converter circuit 3 and 5 represents a current detector for detecting the output current from the cyclo-converter circuit 3. Reference numeral 6 represents a carrier signal generator, 7 represents a reference voltage signal generating circuit and 8 represents an absolute circuit. Reference numeral 9 represents a PWM circuit, 10 represents an inverter switching circuit and 11 represents a cyclo-converter switching circuit. The inverter circuit 1 comprises four semiconductor switching devices S1 to S4, while the cyclo-converter circuit 3 comprises four semiconductor switching devices S5, S6, S5A and S6A. The filter circuit 4 is an LC filter circuit comprising a reactor and a capacitor. Reference numerals 12 and 13 respectively represent a DC power source and a load circuit connected to the DC-to-AC electric power converting apparatus according to the present invention.

Then, the operation of the above-described conventional apparatus will be described with reference to FIG. 18. As shown in the uppermost portion of FIG. 18, reference voltage signal V* in the sine waveform transmitted from the reference voltage signal generating circuit 7 is converted into absolute signal $|V^*|$ by the absolute circuit 8. The absolute signal $|V^*|$ is, together with a carrier signal transmitted from the carrier signal generator 6, supplied to the PWM circuit 9. As a result, the PWM circuit 9 transmits two types binary signals Ta and Tb. That is, the binary signal Ta, the level of which is changed in synchronization with the timing at which the amplitude of the absolute signal $|V^*|$ and that of the carrier signal are allowed to coincide with each other, and the binary signal Tb, the level of which is changed in synchronization with the last transition of the carrier signal, are transmitted. Then, the binary signal Ta and Tb are supplied to the inverter switching circuit 10 so that ON/OFF signals T1 to T4 for switching on/off the four semiconductor switching devices S1 to S4 constituting the inverter circuit 1 are transmitted. That is, the ON/OFF signals T1 and T3 are the same as the binary signals Tb and Ta, respectively. The ON/OFF signals T2 and T4 are the signals obtained by respectively inverting the sign of the binary signals Tb and Ta. When the level of the ON/OFF signals T1 to T4 is high, the corresponding semiconductor switching devices S1 to S4 are switched on. When the same is low, the corresponding semiconductor switching devices S1 to S4 are switched off. As a result of the structure shown in FIG. 17, the relationships among the semiconductor switching devices S1 to S4 and the secondary voltage V2 of the transformer 2 are expressed as follows:

When the switches S1 and S3 are switched on: $V2=0$

When the switches S1 and S4 are switched on:
$V2=Vdc$

When the switches S2 and S3 are switched on:
$V2=-Vdc$

When the switches S2 and S4 are switched on: $V2=0$ \hfill (1)

where symbol Vdc denotes the DC output voltage from the DC power source 12.

Therefore, when the semiconductor switching devices S1 to S4 constituting the inverter circuit 1 are switched on/off in response to the ON/OFF signals T1 to T4, V2; becomes AC voltage the pulse width of which has been modulated as shown in FIG. 18.

When the binary signal Tb, the reference voltage signal V* and output current icc from the cyclo-converter circuit 3 transmitted from the current detector 5 are supplied to the cyclo-converter switching circuit 11, ON/OFF signals T5, T6, T5A and T6A for respectively switching on/off the four semiconductor switching devices S5, S6, S5A and S6A constituting the cyclo converter circuit 3 are transmitted from the cyclo-converter switching circuit 11. It is assumed that the polarity of the output current icc is defined in such a manner that the direction, in which the output current icc is supplied to the load circuit 13, is positive. When the polarity of the icc is positive, the semiconductor switching device S5 or S6 is switched on/off. When the same is negative, S5A or S6A is switched on/off.

As a result of the structure arranged as shown in FIG. 17, the relationship between the output voltage Vcc from the cyclo-converter circuit 3 and the secondary voltage V2 of the transformer 2 is expressed as follows:

When S5 or S5A is switched on: $Vcc=V2$

When S6 or S6A is switched on: $Vcc=-V2$ \hfill (2)

Therefore, when the ON/OFF signal T5 or T5A is made the same as the binary signal Tb and and when the ON/OFF signal T6 or T6A is made the signal formed by inverting the sign of the binary signal Tb, the polarity of Vcc becomes positive. When the ON/OFF signal T5 or T5a is made the signal formed by inverting the sign of the binary signal Tb and when the ON/OFF signal T6 or T6A is made the same as the binary signal Tb, the polarity of Vcc becomes negative. As a result, the cyclo-converter switching circuit 11 discriminates the polarity of the reference voltage signal V* and the output current icc from the cyclo-converter circuit 3 respectively supplied from the reference voltage signal generating circuit 7 and the current detector 5. Thus, the ON/OFF signals T5, T6, T5A and T6A as shown in FIG. 18 are generated from the binary signal Tb supplied from the PWM circuit 9 in accordance with the thus discriminated polarity. In accordance with this sine-wave voltage, the pulse width of which has been modulated and which is as shown in the lowermost portion of FIG. 18, can be obtained as the output voltage Vcc from the cyclo-converter 3. When the obtained output voltage Vcc is then supplied to the filter circuit 4, sine-wave voltage VL, from which the high frequency component has been eliminated due to the PWM operation, is supplied to the load circuit 13. When the frequency of the carrier signal is raised sufficiently with respect to the frequency of the reference voltage signal V* at this time, the load voltage VL to be supplied to the load circuit 13 becomes the voltage from which the high frequency component has been sufficiently removed due to the PWM operation and the amplitude and the phase thereof have been made substantially the same as those of the reference voltage signal V*. FIG. 18 illustrates a switching pattern when the load circuit 13 has been made the linear load of the delay power factor.

As described above, the conventional DC-to-AC electric power converting apparatus receives DC electric power and transmits AC electric power in accordance with the reference voltage signal. The above-described DC-to-AC electric power converting apparatus is usually called "a high frequency intermediate link type electric power converting apparatus" since the high frequency electric power is supplied/received via a transformer. Heretofore, structures employing high frequency intermediate link type electric power converting apparatus in an AC power source apparatus such as the uninterruptive power supply system have been realized to enable the size and the weight of the insulating transformer and the filter circuit to be reduced. However, the conventional DC-to-AC electric power converting apparatus has its structure arranged in such a manner that the PWM operation is performed in the inverter circuit 1. That is, when the conventional DC-to-AC electric power converting apparatus is desired to be made a multi-phase structure, both the inverter circuit 1 and the cyclo-converter circuit 3 must converted to multi-phase structures. Furthermore, it is necessary for both the inverter circuit 1 and the cyclo-converter circuit 3 to be controlled simultaneously in the form of a pair when the above-described conventional DC-to-AC electric power converting apparatus is desired to be used in the uninterruptive power supply system. As a result, flexibility in the constitution of the system, at the time of changing the capacity of the power source and employing the battery power supply system, is undesirably lost.

SUMMARY OF THE INVENTION

Accordingly, an object of the present invention is to provide a DC-to-AC electric power converting apparatus exhibiting excellent flexibility in the system constitution at the time of changing the capacity of the power source and employing the battery power supply apparatus which is necessary to constitute an uninterruptive power supply system.

A DC-to-AC electric power converting apparatus according to the present invention comprises: an inverter circuit for converting DC electric power into AC electric power; a transformer connected to the inverter circuit; a cyclo-converter circuit for converting the frequency of the output from the transformer; a carrier signal generator for generating a carrier signal of a predetermined frequency; an inverter switching circuit for generating a signal for controlling the inverter circuit in synchronization with the carrier signal; a reference voltage signal generating circuit for generating a reference signal for the AC voltage to be transmitted from the cyclo-converter circuit; a first switching signal generating circuit for generating a switching signal in accordance with the reference voltage signal supplied from the reference voltage signal generating circuit and the carrier signal supplied from the carrier signal generator; and a cyclo-converter switching circuit for generating a signal for controlling the cyclo-converter circuit in accordance with the switching signal supplied from the first switching signal generating circuit.

Other and further objects, features and advantages of the invention will be appear more fully from the following description.

DESCRIPTION OF THE PREFERRED EMBODIMENTS

Preferred embodiments of the present invention will now be described with reference to the drawings.

Figure 1:
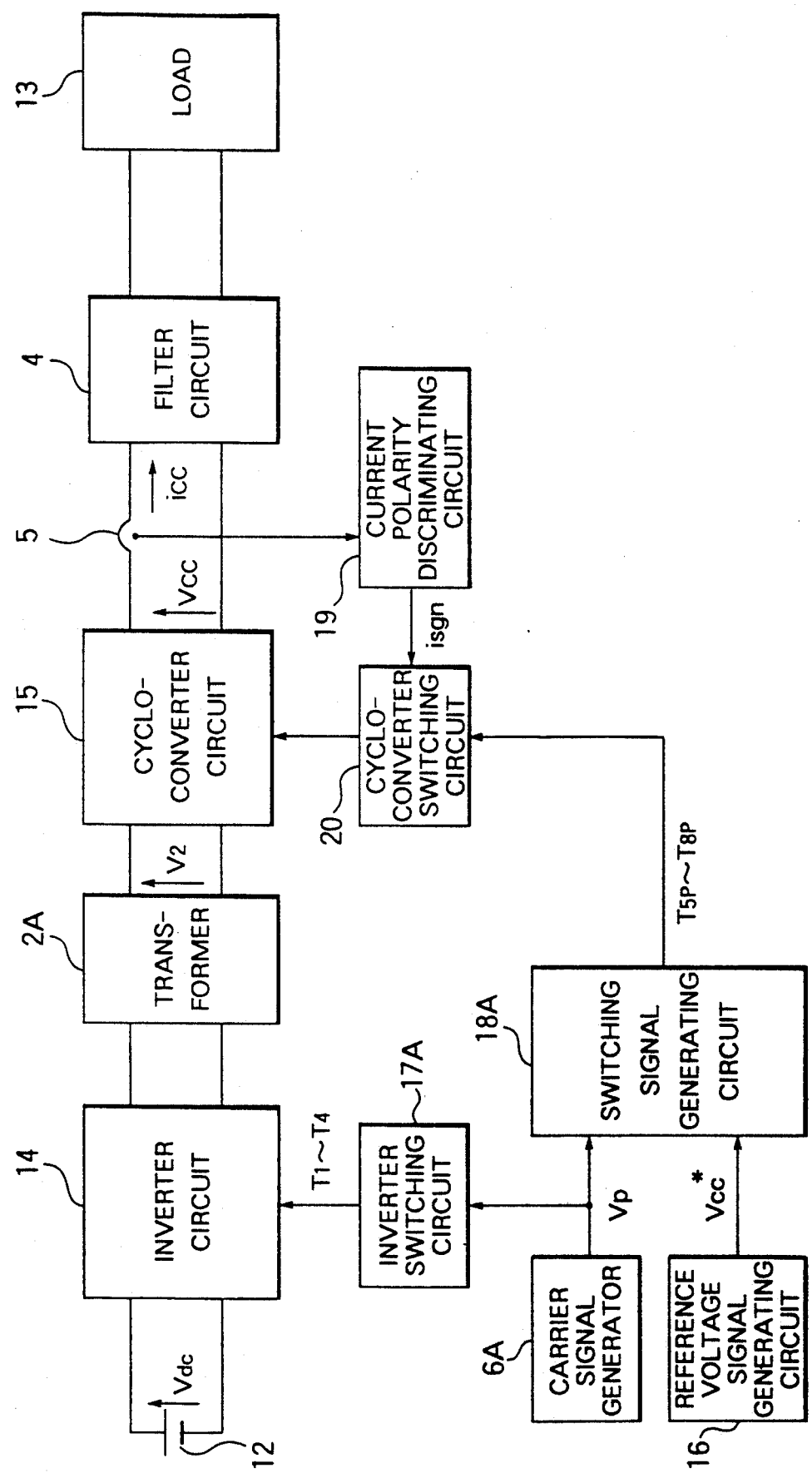
FIG. 1 is a block diagram which illustrates a first embodiment of the present invention.

FIGS. 1 to 6 illustrate a first embodiment of the present invention, where FIG. 1 illustrates the structure of the first embodiment. Referring to FIG. 1, reference numeral 2A represents a transformer, 6A represents a carrier signal generator, 14 represents an inverter circuit and 15 represents a cyclo-converter circuit. Reference numeral 16 represents a reference voltage signal generating circuit and 17A represents an inverter switching circuit. Reference numeral 18A represents a switching signal generating circuit, 19 represents a current polarity discriminating circuit and 20 represents a cyclo-converter switching circuit. The filter circuit 4, the current detector 5, the DC power source 12 and the load circuit 13 are the same as those for the conventional structure.

Figure 2:
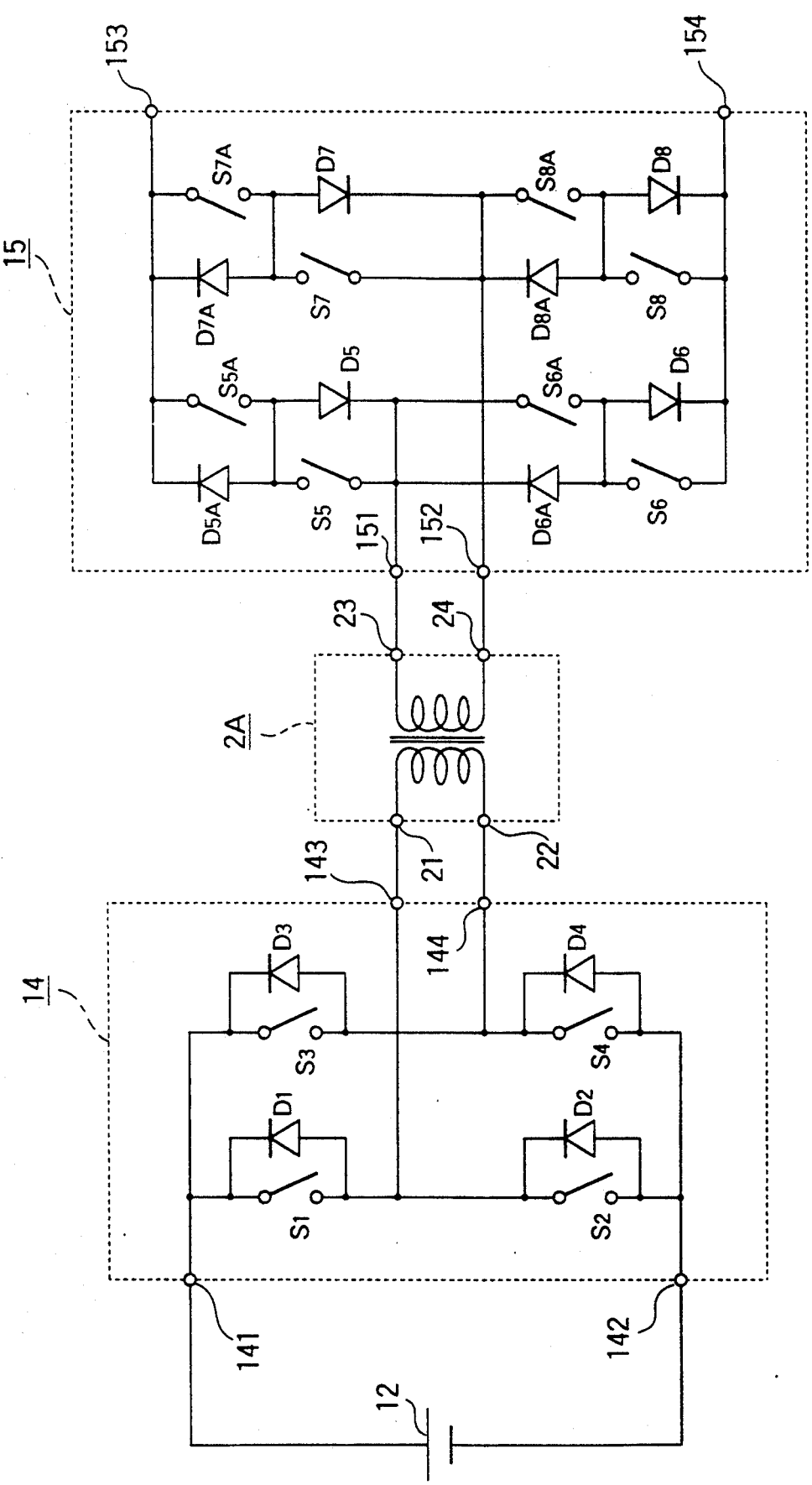
FIG. 2 is a block diagram which illustrates an inverter circuit, a transformer and a cyclo-converter circuit according to the first embodiment.

FIG. 2 illustrates the detailed structure of each of the inverter circuit 14, the transformer 2A and the cyclo-converter circuit 15. The inverter circuit 14 comprises input terminals 141 and 142 connected to the DC power source 12, semiconductor switching devices S1 to S4 such as transistors and MOSFETs, diodes D1 to D4 connected to the respective switching devices S1 to S4 in an inverted parallel manner and output terminals 143 and 144. The transformer 2A comprises primary coil terminals 21 and 22 connected to the output terminals 143 and 144 of the inverter circuit 14 and secondary coil terminals 23 and 24. The cyclo-converter circuit 15 comprises input terminals 151 and 152 connected to the secondary coil terminals 23 and 24 of the transformer 2A, semiconductor switching devices S5 to S8 and S5A to S8A such as transistors and MOSFETs, diodes D5 to D8 and D5A to D8A connected to the above-described switching devices S5 to S8 and S5A to S8A in an inverted parallel manner and output terminals 153 and 154 connected to the filter circuit 4. The above-described two semiconductor switching devices Sn and SnA (n=5 to 8) and diodes Dn and DnA (n=5 to 8) connected to the two semiconductor switching devices Sn and SnA (n=5 to 8) constitute bidirectional switches each of which is arranged in such a manner that the direction, through which electric power is supplied, can be controlled.

Figure 3:
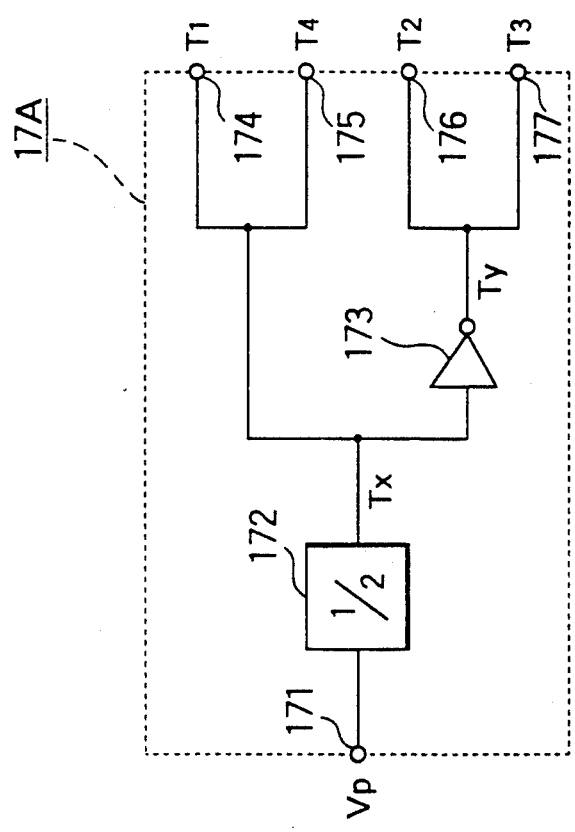
FIG. 3 is a block diagram which illustrates an inverter switching circuit according to the first embodiment.

FIG. 3 illustrates the detailed structure of the inverter switching circuit 17A which comprises an input terminal 171 connected to the carrier signal generator 6A, a ½ divider 172 the polarity of the output signal from which is inverted in synchronization with the last transition of the signal supplied to the input terminal 171, NOT circuit 173 connected to the ½ divider 172 and output terminals 174 to 177.

Figure 4:
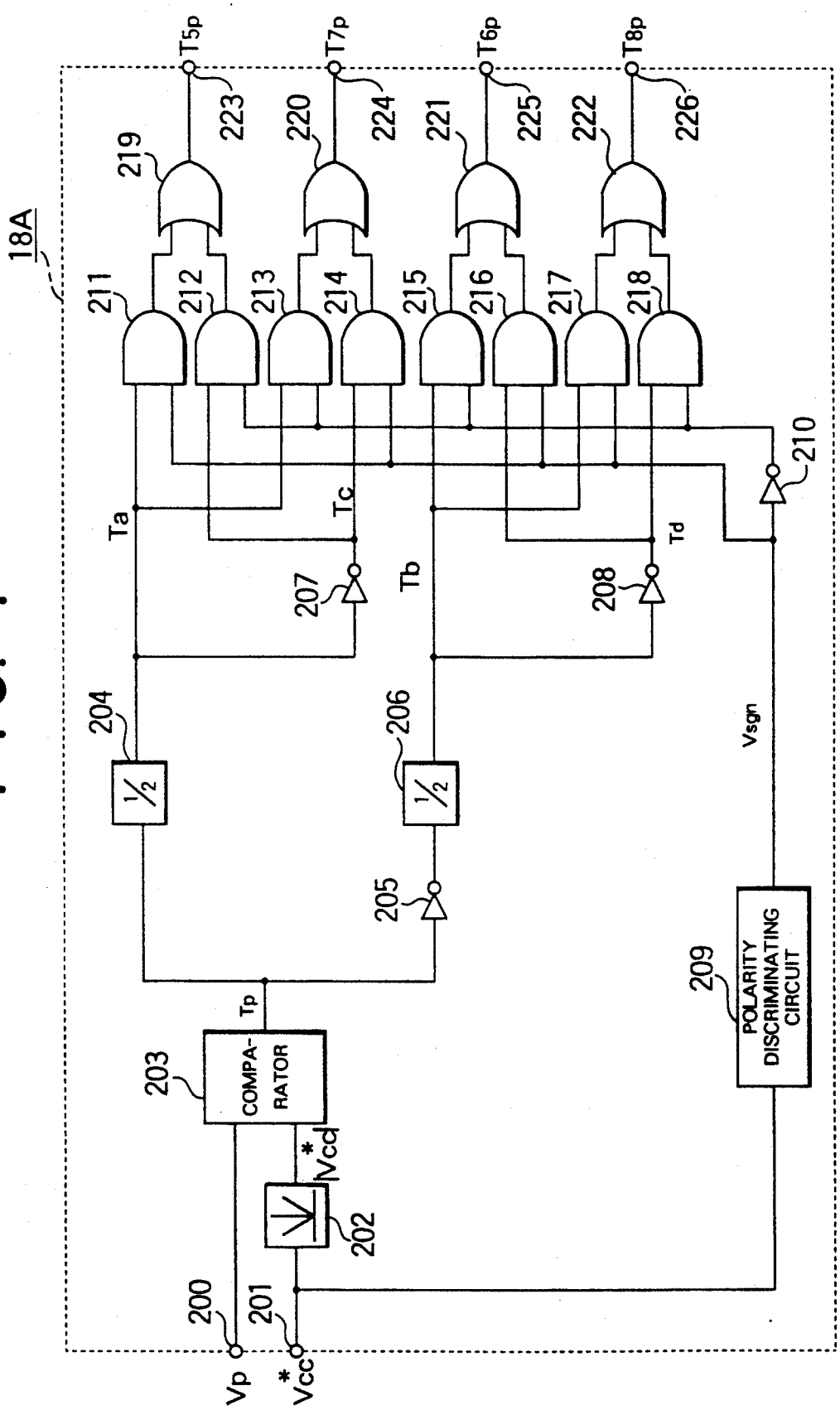
FIG. 4 is a block diagram which illustrates a switching signal generating circuit according to the first embodiment.

FIG. 4 illustrates the detailed structure of the switching signal generating circuit 18A which comprises an input terminal 200 connected to the carrier signal generator 6A, an input terminal 201 connected to the reference voltage signal generating circuit 16, an absolute circuit 202, a comparator 203, NOT circuits 205, 207, 208 and 210, ½-dividers 204 and 206 the polarity of the output from which is inverted in synchronization with the last transition of the input signal, a polarity discriminating circuit 209, AND circuits 211 to 218, OR circuits 219 to 222 and output terminals 223 and 226.

Figure 5:
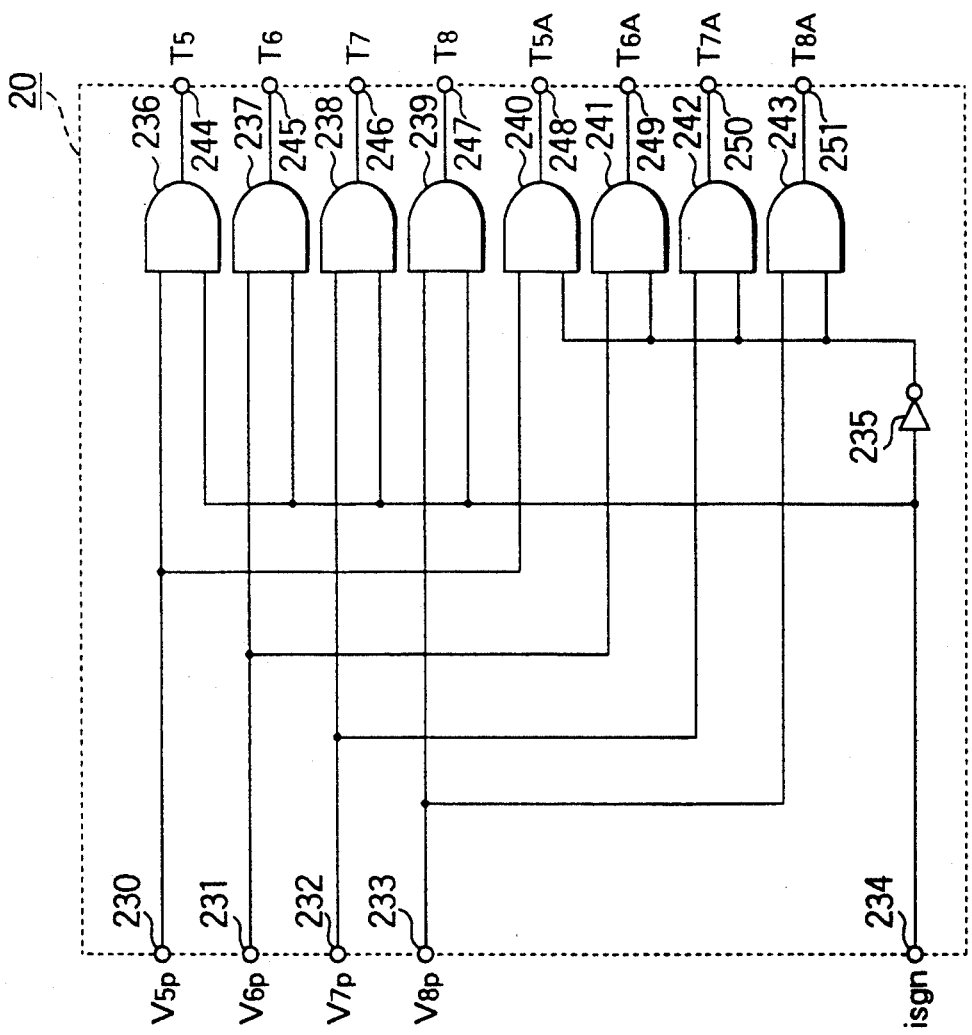
FIG. 5 is a block diagram which illustrates a cyclo-converter switching circuit according to the first embodiment.

FIG. 5 illustrates the detailed structure of the cyclo-converter switching circuit 20, the cyclo-converter switching circuit 20 comprising input terminals 230 to 233 connected to the output terminals 223 to 226 of the switching signal generating circuit 18A, an input terminal 234 connected to the current polarity discriminating circuit 19, a NOT circuit 235, AND circuits 236 to 243 and output terminals 244 to 251.

Figure 6:
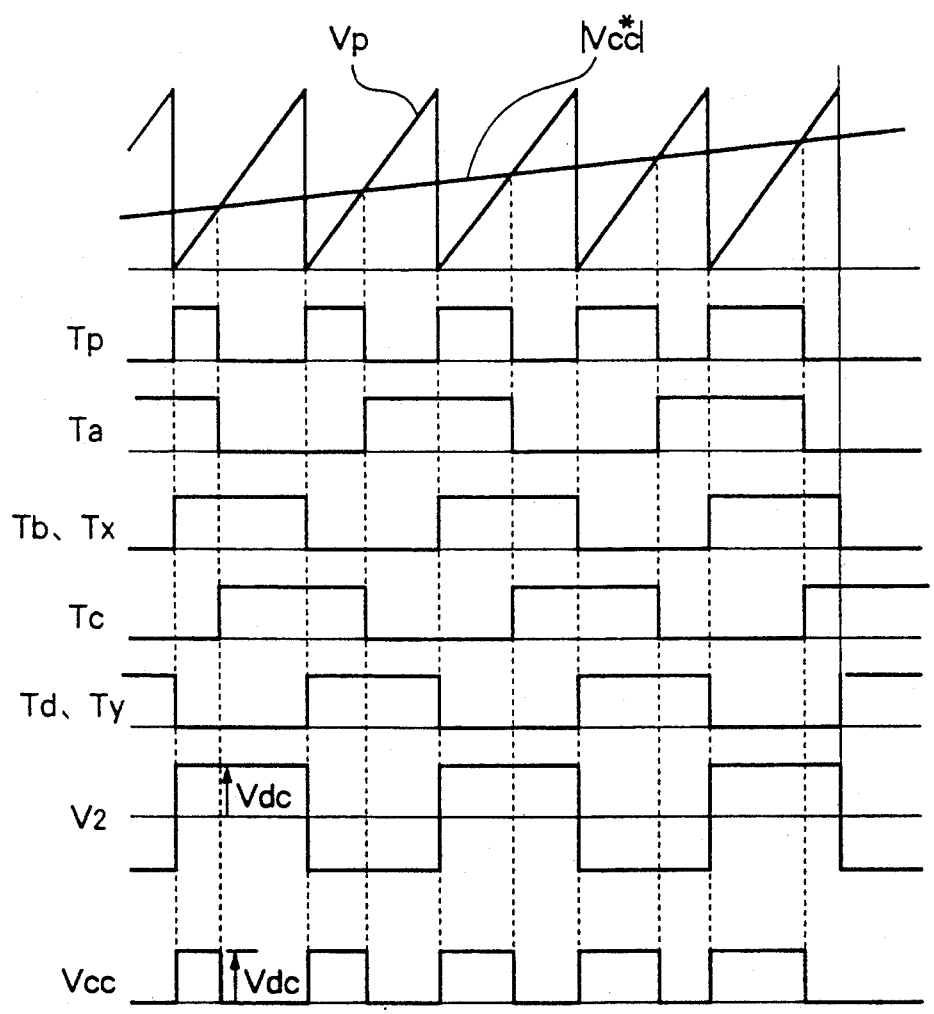
FIG. 6 is a timing chart which illustrates the operation of the first embodiment.

Then, the operation of the above-described structure will be described with reference to a timing chart shown in FIG. 6. First, carrier signal Vp in the sawtooth form as shown in the uppermost portion of FIG. 6 is transmitted from the carrier signal generator 6A. Then, ON/OFF signals T1 to T4, the duty ratio of each of which is 50%, are transmitted from the inverter switching circuit 17A due to the following operation: referring to FIG. 3, the carrier signal Vp is supplied via the input terminal 171, signal Tx of the same waveform as the signal Tb shown in FIG. 6 is transmitted from the ½ divider 172, while signal Ty formed by inverting the sign of the signal Tx is transmitted from the NOT circuit 173, the signal Ty being in the same waveform as that of signal Td shown in FIG. 6. As a result, the signal Tx serving as the ON/OFF signals T1 and T4 are transmitted through the output terminals 174 and 175, while the signal Ty serving as the ON/OFF signals T2 and T3 are transmitted through the output terminals 176 and 177. When the level of each of the ON/OFF signals T1 to T4 is high, the corresponding semiconductor switching devices S1 to S4 of the inverter circuit 14 shown in FIG. 2 are switched on, while the same are switched off when the above-described level is low. As a result of the structure shown in FIG. 2, the relationships among the semiconductor switching devices S1 to S4 and the secondary voltage V2 of the transformer 2A are expressed as follows:

When the switches S1 and S4 are switched on:
$V2 = Vdc$

When the switches S2 and S3 are switched on:
$V2 = -Vdc$ (3)

where symbol Vdc denotes the DC output voltage from the DC power source 12. Therefore, the secondary voltage V2 becomes rectangular wave voltage the duty ratio of which is 50% as shown in FIG. 6.

On the other hand, reference voltage signal Vcc*, which denotes the voltage to be transmitted from the cyclo-converter circuit 15, is transmitted from the reference voltage signal generating circuit 16 so as to be supplied to the switching signal generating circuit 18A together with the carrier signal Vp. When the switching signal generating circuit 18A receives the above-described signals Vcc* and Vp, it transmits the switching signals T5p to T8p, the pulse width of each of which has been modulated, as follows: referring to FIG. 4, the reference voltage signal Vcc* supplied through the input terminal 201 is converted into absolute signal |Vcc*| by the absolute circuit 202. The absolute signal |Vcc*| is, together with the carrier signal Vp supplied through the input terminal 200, supplied to the comparator 203. The comparator 203 transmits signal Tp shown in FIG. 6. The signal Tp is supplied to the ½-divider 204 so as to be converted into signal Ta. When the sign of the signal Tp has been inverted by the NOT circuit 205 and supplied to the ½-divider 206, signal Tb shown in FIG. 6 is transmitted. When the signal Ta is supplied to the NOT circuit 207, signal Tc is transmitted. When the signal Tb is supplied to the NOT circuit 208, signal Td is transmitted. Then, the relationships among the signals Ta to Td and the output voltage Vcc from the cyclo-converter circuit 15 will be described. When the polarity of the output voltage Vcc is positive, the switching signals T5p to T8P are determined in accordance with the following equations:

$$T5P = Ta, \ T6P = Td, \ T7P = Tc, \ T8P = Tb \quad (4)$$

In response to the switching signals T5p to T8p, the ON/OFF signal Tn or TnA (n=5 to 8) of either the semiconductor switching devices Sn or SnA (n=5 to 8) constituting the bi-directional switch is transmitted from the cyclo-converter switching circuit 20. The relationships among the operation of the semiconductor switching devices S5 to S8 and S5A to S8A and the output voltage Vcc from the cyclo-converter circuit 15 are expressed by the following equations:

When S5 and S8 (or S5A and S8A) is switched on;
$\quad$ Vcc = V2

When S6 and S7 (or S6A and S7A) is switched on:
$\quad$ Vcc = −V2

When S5 and S6 (or S5A and S6A) is switched on:
$\quad$ Vcc = 0

When S7 and S8 (or S7A and S8A) is switched on:
$\quad$ Vcc = 0 $\quad (5)$

Therefore, as can be shown from Equations (4) and (5), when the levels of the signals Ta and Tb are simultaneously high, Vcc = V2. When the levels of the signals Tc and Td are simultaneously high, Vcc = −V2. When the levels of the signals Ta and Td are simultaneously high or when the levels of the signals Tb and Tc are simultaneously high, Vcc=0. Therefore, the output voltage Vcc from the cyclo-converter circuit 15 is, as shown in the lowermost portion of FIG. 6, subjected to the PWM operation so as to be made positive voltage. On the contrary, when the polarity of Vcc is desired to be made negative, the switching signals T5p to T8p may be determined in accordance with the following equations:

$$T5P = Tc, \ T6P = Tb, \ T7P = Ta, \ T8P = Td \quad (6)$$

Then, the operation of the switching signal generating circuit 18A will be described. The polarity discriminating circuit 209 transmits polarity signal Vsgn of the reference voltage signal Vcc*. Furthermore, the NOT circuit 210 transmits a signal obtained by inverting the sign of the polarity signal Vsgn. The above-described signals and signals Ta to Td are supplied to the OR circuits 219 to 222 via the AND circuits 211 to 218. When the polarity of the reference voltage signal Vcc* is positive, the signals Ta, Tc, Td and Tb are transmitted from the corresponding AND circuits 211, 214, 216 and 217. Therefore, the output terminals 223 to 226 transmit the switching signal T5p to T8p which correspond to Equation (4). Similarly, when the polarity of the reference voltage signal Vcc* is negative, the switching signals T5p to T8p corresponding to Equation (6) are transmitted.

Referring to FIG. 1, output current icc from the cyclo-converter circuit 15 which has been transmitted from the current detector 5 is supplied to the current polarity discriminating circuit 19. Then, polarity signal isgn of the output current icc is transmitted from the current polarity discriminating circuit 19. The polarity signal isgn is, together with the switching signals T5p to T8p transmitted from the switching signal generating circuit 18A, supplied to the cyclo-converter switching circuit 20 shown in FIG. 5. Then, the cyclo-converter switching circuit 20 transmits the ON/OFF signals T5 to T8 and T5A to T8A for the corresponding semiconductor switching devices S5 to S8 and S5A to S8A of the cyclo-converter circuit 15 from its output terminals 244 to 251 in accordance with the following equations:

When the polarity of icc is positive;

$\quad T5 = T5p, \ T6 = T6p, \ T7 = T7p, \ T8 = T8p$ $\quad$ all of T5A to T8A are "low level"

$\quad$ (all of S5A to S8A are "OFF")

when the polarity of icc is negative;

$\quad T5A = T5p, \ T6A = T6p, \ T7A = T7p, \ T8A = T8p$ $\quad$ all of T5 to T8 are "low level"

$\quad$ (all of S5 to S8 are "OFF") $\quad (7)$

As a result of the above-described operation, the voltage Vcc, the waveform of which has been Obtained by PWM operating the AC reference voltage signal Vcc* transmitted from the reference voltage signal generating circuit 16, is transmitted from the cyclo-converter circuit 15. Furthermore, the high frequency component of the output voltage Vcc is removed by the filter circuit 4 connected to the output of the cyclo-converter circuit 15 before the output voltage Vcc is supplied to the load circuit 13.

As described above, according to the first embodiment, the PWM operation is performed by the cyclo-converter circuit 15. Therefore, the inverter circuit 14 must be switched in such a manner that the secondary voltage V2 of the transformer 2A becomes the rectangular wave voltage the duty ratio of which is 50%. Therefore, when multi-phase AC voltage is desired to be transmitted, the structure must be constituted in such a manner that only the cyclo-converter circuits 15 connected in parallel and the each of the cyclo-converter circuits 15 are individually subjected to the PWM operation. The conventional apparatus in which the inverter circuit is applied widely employs a DC bus line system arranged in such a manner that the DC power source to be supplied to the inverter circuit is commonly used. In a DC-to-AC electric power converting apparatus according to the present invention, flexibility in application of the power supply system can be attained by assuming that the rectangular wave voltage duty ratio is 50% common AC voltage.

Figure 7:
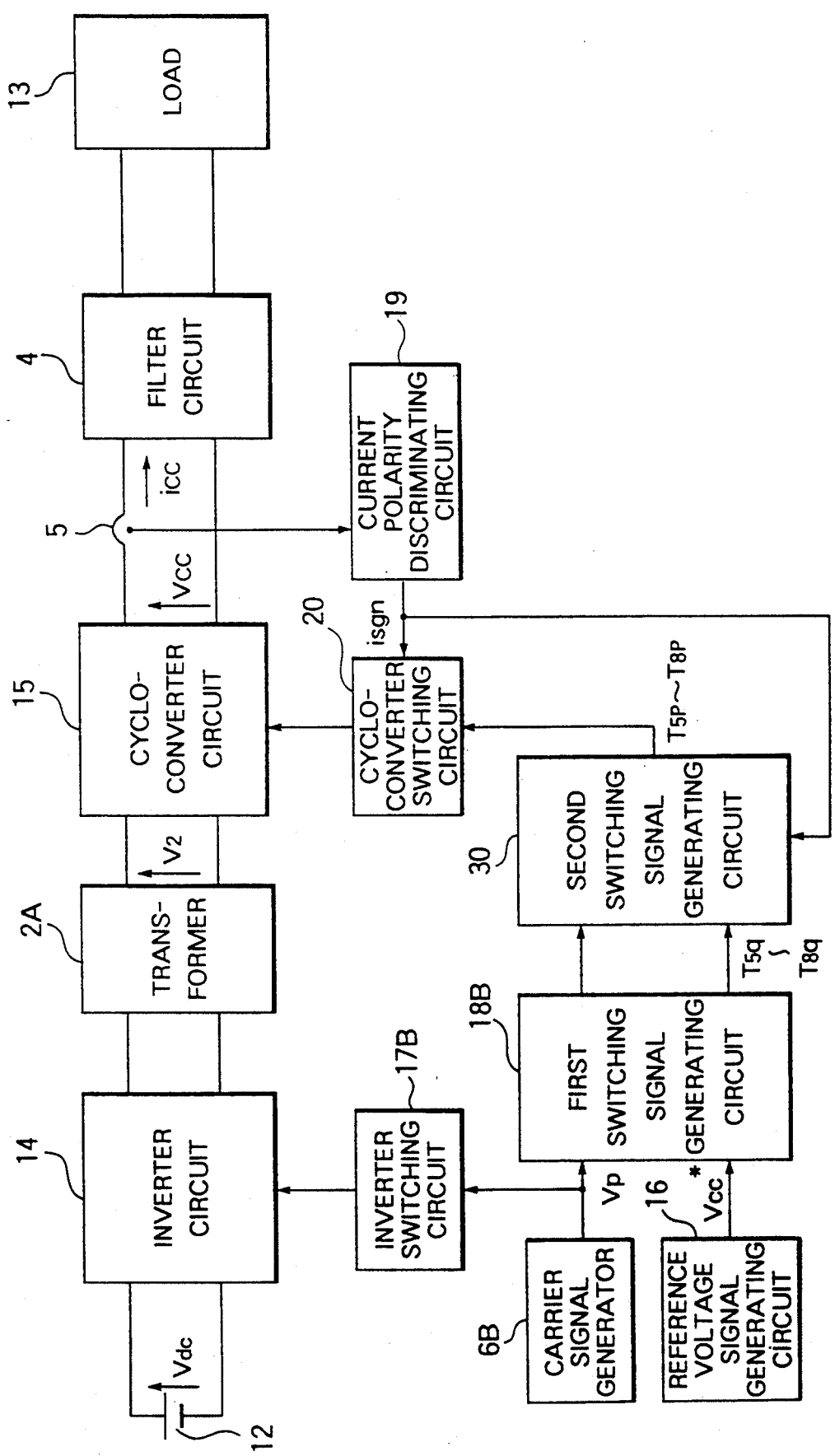
FIG. 7 is a block diagram which illustrates a second embodiment of the present invention.

Then, a second embodiment of the present invention will be described with reference to FIGS. 7 to 10. FIG. 7 is a block diagram which illustrates the second embodiment. Referring to the drawings, reference numeral 6B represents a carrier signal generator, 17B represents an inverter switching circuit and 18B and 30 represent a first and a second switching signal generating circuits.

Other elements are the same as those according to the first embodiment.

Figure 8:
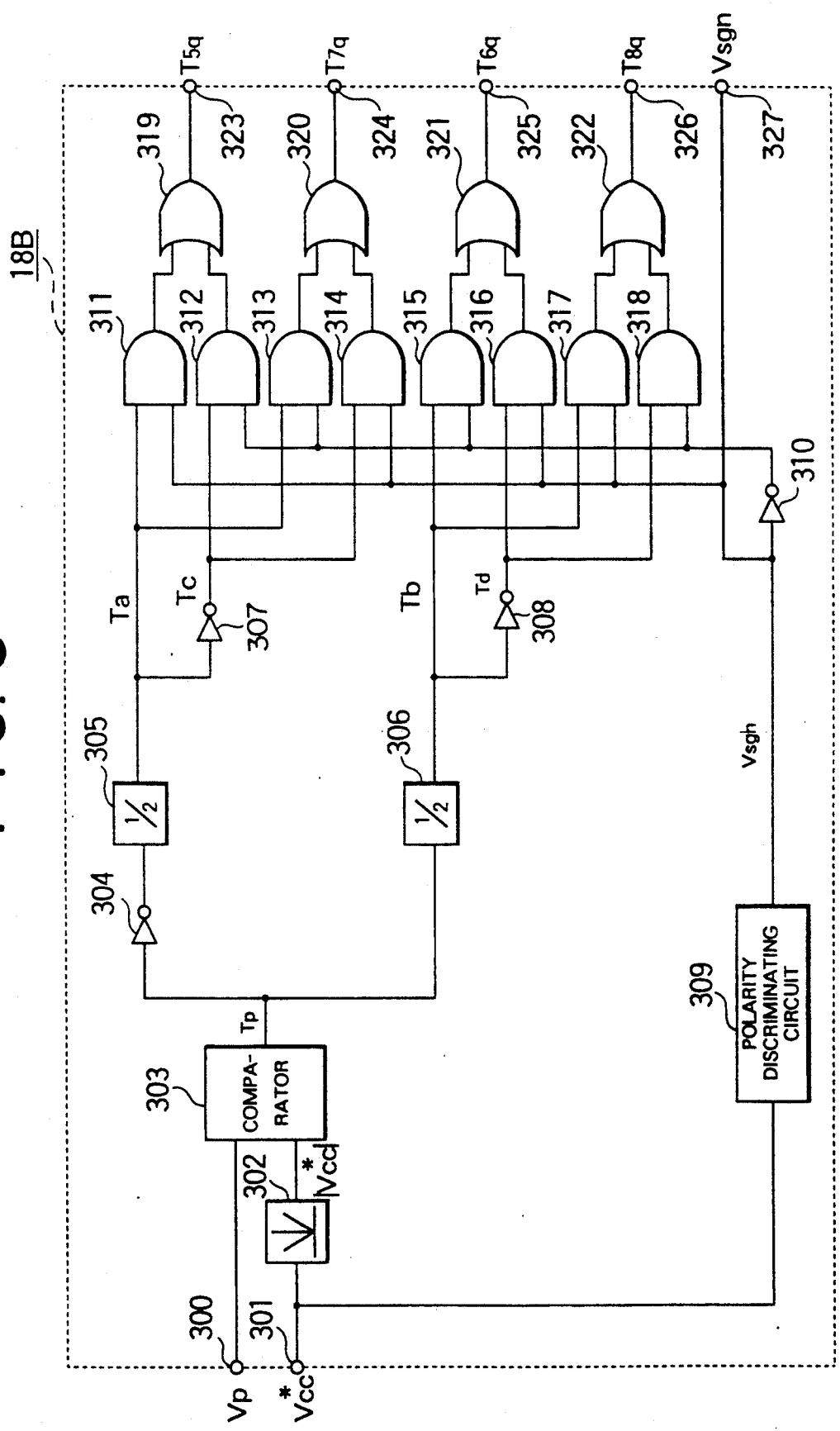
FIG. 8 is a block diagram which illustrates a first switching signal generating circuit according to the second embodiment.

FIG. 8 illustrates the detailed structure of the first switching signal generating circuit 18B, the first switching signal generating circuit 18B comprising an input terminal 300 connected to the carrier signal generator 6B, an input terminal 301 connected to the reference voltage signal generating circuit 16, an absolute circuit 302, a comparator 303, NOT circuits 304, 307, 308 and 310, ½-dividers 305 and 306, the polarity of the output from which is inverted in synchronization with the last transition of the input signal, a polarity discriminating circuit 309, AND circuits 311 to 318, OR circuits 319 to 322 and output terminals 323 and 327.

Figure 9A:
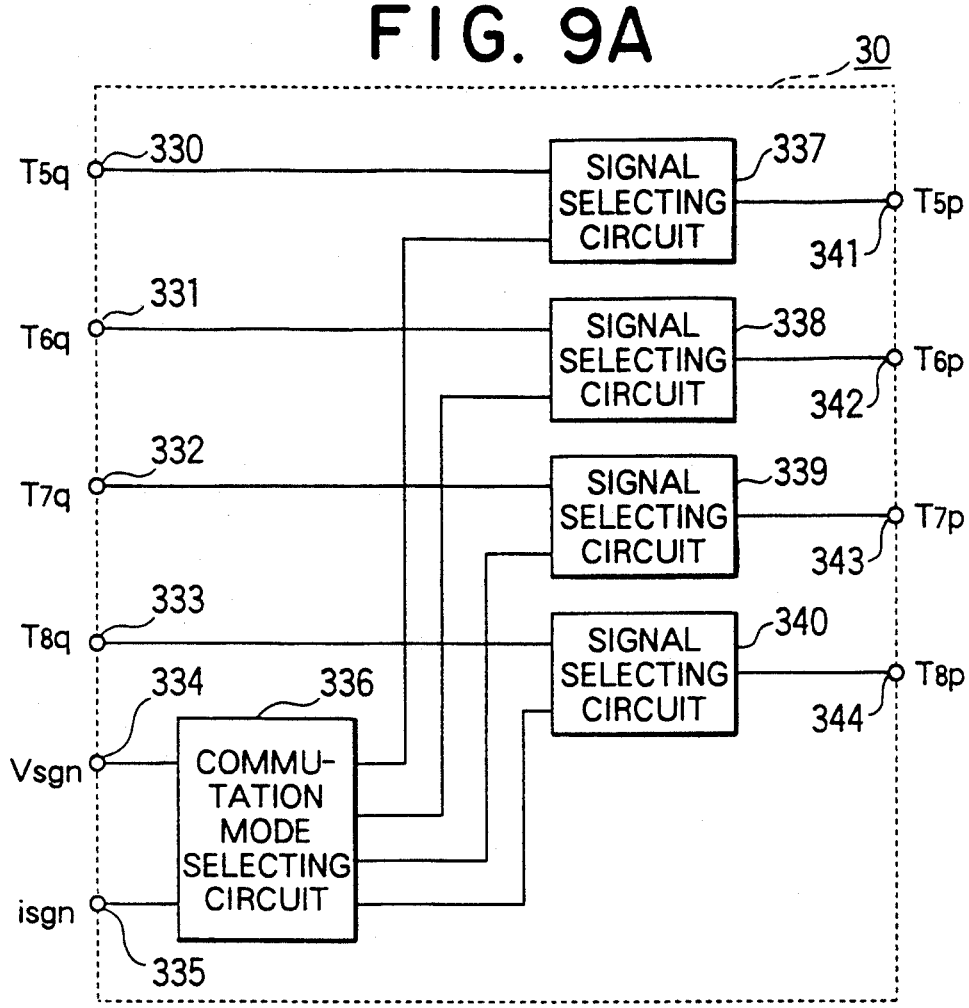
FIG. 9A is a block diagram which illustrates a second switching signal generating circuit according to the second embodiment.

FIG. 9A illustrates the detailed structure of the second switching signal generating circuit 30. Referring to the drawing, reference numerals 330 to 334 represent input terminals connected to the output terminals 323 to 327 of the switching signal generating circuit 18B. Reference numerals 335 represents an input terminal connected to the current polarity discriminating circuit 19 and 336 represents a commutation mode selecting circuit. Reference numerals 337 to 340 represent signal selecting circuits and 341 to 344 represent output terminals.

Figure 9B:
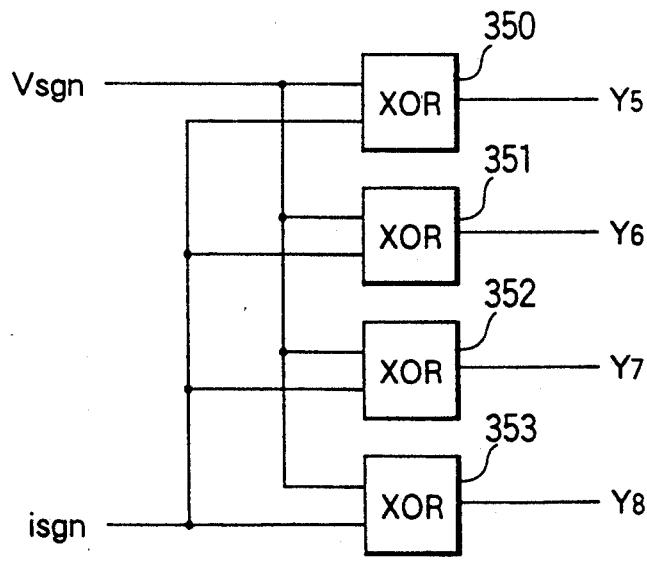
FIGS. 9B and 9C are block diagram which respectively illustrate a commutation mode selecting circuit and a signal selecting circuit shown in FIG. 9A.

FIG. 9B illustrates the detailed structure of the commutation mode selecting circuit 336 which comprises XOR circuits (exclusive OR circuit) 350 to 353.

Figure 9C:
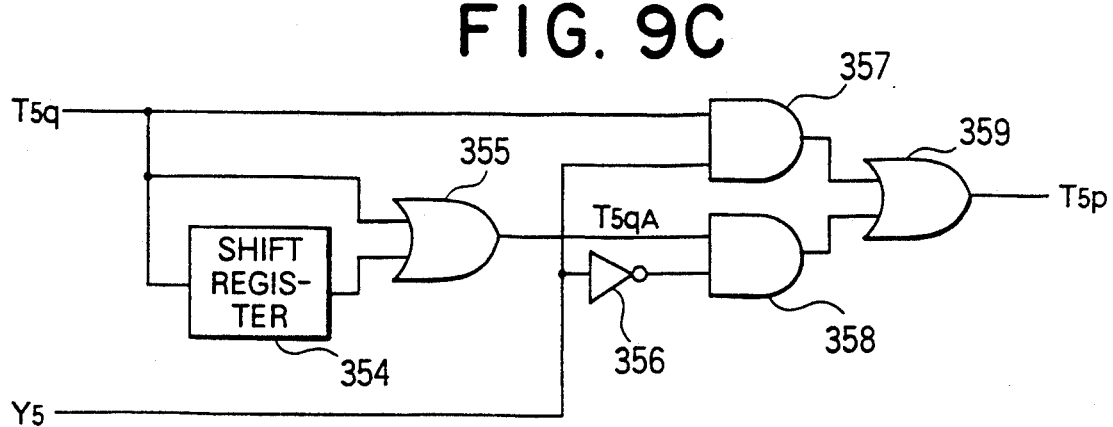

FIG. 9C is a block diagram which illustrates the detailed structure of the signal selecting circuits 337-340. The signal selecting circuit 337 comprises a shift register circuit 354, OR circuits 355 and 359, a NOT circuit 356 and AND circuits 357 and 358.

Figure 9D:
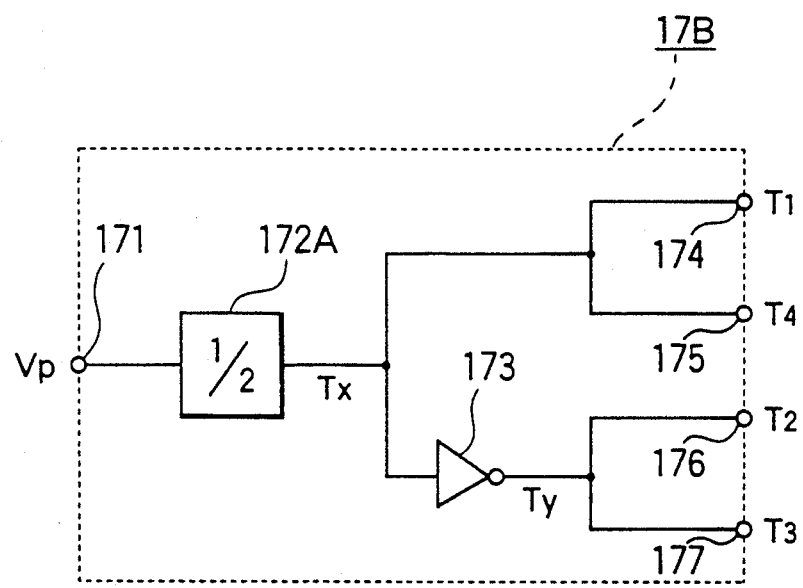
FIG. 9D is a block diagram which illustrates an inverter switching circuit according to the second embodiment.

As shown in FIG. 9D, the inverter switching circuit 17B is constituted by replacing the ½-divider 172, the polarity of the output signal of which is inverted in synchronization with the last transition of the input signal to the inverter switching circuit 17A shown in FIG. 3, by a ½-divider 172A, the polarity of the output signal of which is inverted in synchronization with the first transition of the input signal.

Figure 10:
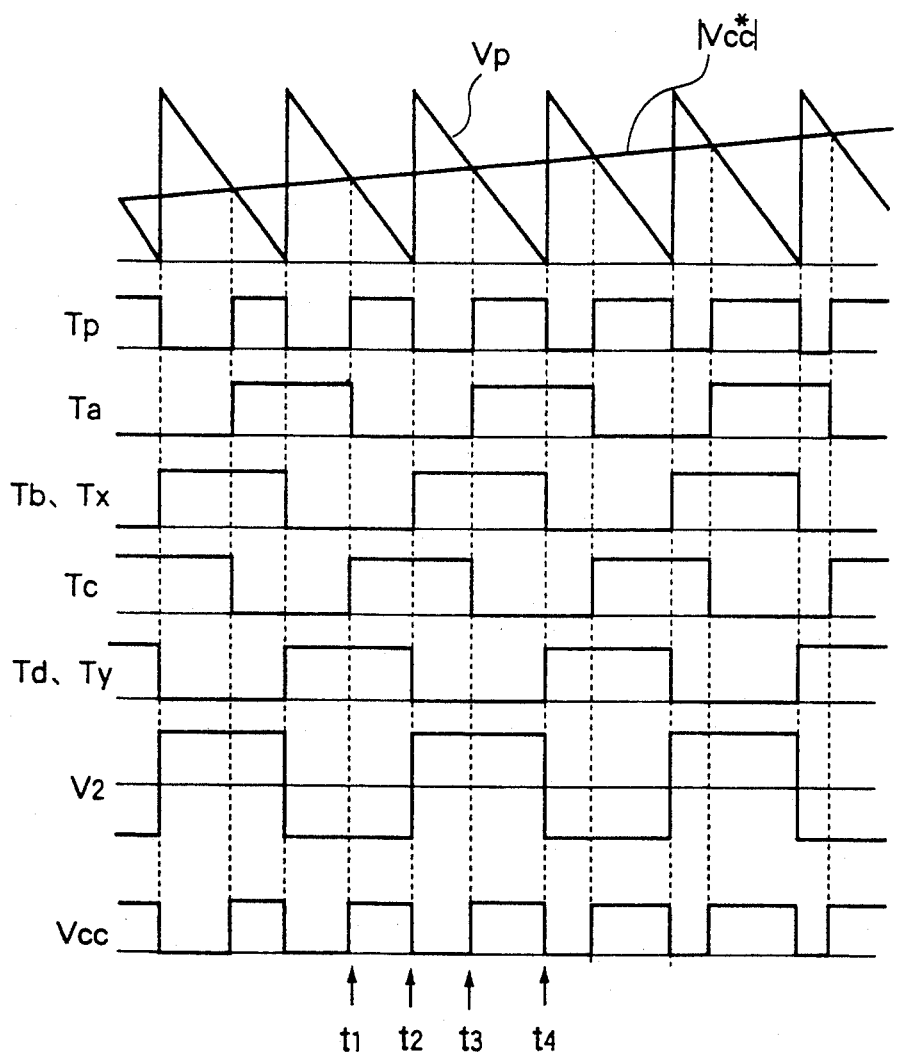
FIG. 10 is a timing chart which illustrates the operation of the second embodiment.

Now, the operation of the above-described second embodiment will be described with reference to FIG. 10. First, carrier signal Vp in a saw tooth shape which is lowered to the right as shown in the uppermost portion of FIG. 10 is transmitted from the carrier signal generator 6B. When the carrier signal Vp is then supplied to the inverter switching circuit 17B via the input terminal 171, signals Tx and Ty as shown in FIG. 10 are respectively transmitted from the ½-divider 172A and the NOT circuit 173. When the four semiconductor switching devices S1 to S4 of the inverter circuit 14 are switched on/off in response to the ON/OFF signals T1 to T4 obtained from the above-described signals Tx and Ty, the secondary voltage V2 of the transformer 2A becomes rectangular wave voltage the duty ratio of which is 50% as shown in FIG. 10 from the relationship expressed by Equation (3). Since the above-described operation is the same as that according to the first embodiment, the detailed description about it is omitted here.

Then, the reference voltage signal Vcc* denoting the voltage to be transmitted from the cyclo-converter circuit 15, is transmitted from the reference voltage signal generating circuit 16 so as to be supplied, together with the carrier signal Vp transmitted from the carrier signal generator 6B, to the first switching signal generating circuit 18B. The first switching signal generating circuit 18B then transmits first switching signals T5q to T8q due to the following operation: referring to FIG. 8, the reference voltage signal Vcc* supplied through the input terminal 301 is supplied to the absolute circuit 302 so that the absolute signal |Vcc*| is transmitted. The absolute signal |Vcc*| is, together with the carrier signal Vp supplied through the input terminal 300, supplied to the comparator 303. The comparator 303 transmits signal Tp shown in FIG. 10. The signal Tp is supplied to the NOT circuit 304 so as to have the sign thereof inverted before supplied to the ½-divider 305. As a result, the signal Ta, as shown in FIG. 10, is transmitted. When the signal Tp is supplied to the ½-divider 306, the signal Tb as shown in FIG. 10 is transmitted. When the signal Ta and Tb are respectively supplied to the NOT circuits 307 and 308, signal Tc and Td are transmitted.

On the other hand, the reference voltage Vcc*, supplied through the input terminal 301, is then supplied to the polarity discriminating circuit 309 so that the polarity signal Vsgn is transmitted. Furthermore, the first switching signals T5q to T8q are obtained in accordance with the following equations by the AND circuits 311 to 318, the OR circuits 319 to 322 and the NOT circuit 310:

When the polarity of Vcc* is positive (when the level of Vsgn is high):

$$V5q=Ta, V6q=Td, V7q=Tc, V8q=Tb$$

When the polarity of Vcc* is negative (when the level of Vsgn is low):

$$V5q=Tc, V6q=Tb, V7q=Ta, V8q=Td \qquad (8)$$

The above-described first switching signals T5q to T8q and the polarity signal Vsgn are respectively transmitted through the output terminals 323 to 327.

It is apparent from the above-described operation of the first embodiment that voltage the pulse width of which has been modulated as shown in the lowermost portion of FIG. 10 and the polarity of which is positive is transmitted from the cyclo-converter circuit 15 when the polarity of Vcc* is, for example, positive. The above-described voltage is enabled to be transmitted by omitting the second switching signal generating circuit 30 the operation of which will be described later and by respectively and directly supplying the first switching signals T5q to T8q to the cyclo-converter switching circuit 20 as the switching signals T5p to T8p.

Then, the commutation operation of the eight semiconductor switching devices S5 to S8 and S5A to S8A constituting the cyclo-converter circuit 15 will be described prior to making the description about the operation of the switching signal generating circuit 30. First, the case where both the polarity of the output voltage Vcc and that of the output current icc from the cyclo-converter circuit 15 are positive will be described. Since the polarity of the output current icc is positive at this time, the four semiconductor switching devices S5 to S8 of the eight semiconductor switching devices S5 to S8 and S5A to S8A, which constitute the cyclo-converter circuit 15, are switched on/off by the cyclo-converter switching circuit 20. Since the polarity of the output voltage Vcc is positive, that is, since the polarity of the reference voltage signal Vcc* is positive, the switching devices S5, S8, S7; and S6 are, as shown in FIG. 10, switched on/off in response to signals Ta, Tb, Tc and Td from the relationship expressed by equation (8).

The commutation is performed among the above-described switching devices during time period t1 to t4 shown in FIG. 10. That is, the commutation from the device S5 to S7 is performed at time t1, the commutation from the device S6 to S8 is performed at time t2, the commutation from the device S7 to S5 is performed at time t3 and the commutation from the device S8 to S6 is performed at time t4. Then, the commutation from the switching device S5 to S7 at time t1 will be described. As shown in FIG. 10, since the polarity of the secondary voltage V2 of the transformer 2A is negative at the time of the commutation, the switching device S5 is inversely biased as shown in FIG. 2. Therefore, it is apparent that the commutation of the power source can be performed. Similarly, it is apparent that the commutation of the power source can also be performed at other time t2 to t4.

Then, the case where the polarity of the output voltage Vcc from the cyclo-converter circuit 15 is positive and as well the polarity of the output current icc is negative will be described. Since the polarity of the output current icc is negative at this time, the four semiconductor switching devices S5A to S8A of the eight semiconductor switching devices S5 to S8 and S5A to S8A. which constitute the cyclo-converter circuit 15, are switched on/off by the cyclo-converter switching circuit 20. Since the polarity of the output voltage Vcc is positive, that is, since the polarity of the reference voltage signal Vcc* is positive, the switching devices S5A, S8A, S7A and S6A are, as shown in FIG. 10, switched on/off in response to the signals Ta, Tb, Tc and Td from the relationship expressed by equation (8).

The commutation is performed among the above-described switching devices during time period t1 to t4 shown in FIG. 10. That is, the commutation from the device S5A to S7A is performed at time t1, the commutation from the device S6A to S8A is performed at time t2, the commutation from the device S7A to S5A is performed at time t3 and the commutation from the device S8A to S6A is performed at time t4. Then, the commutation from the switching device S5A to S7A at time t1 will be described. As shown in FIG. 10, since the polarity of the secondary voltage V2 of the transformer 2A is negative at the time of the commutation, the switching device S5A is forward biased as shown in FIG. 2. Therefore, it is apparent that the commutation of the power source cannot be performed. Similarly, it is apparent that the commutation of the power source cannot be performed at other time t2 to t4. That is, in the above-described cases, the commutation of each of the switching devices must be forcibly performed.

Then, the case where the polarity of the output voltage Vcc is negative will be described. The commutation of the power source of the switching devices S5 and S8 (or S5A to S8A) can be performed when the polarity of the output voltage Vcc and that of the output current icc are the same. When the polarity is different from each other, the commutation of the power source cannot be performed. In the case where the power source commutation is employed, the off-timing of the switching signal (the timing at which the signals Ta to Td are changed from a high level to a low level with reference to FIG. 10) may be delayed by at least the commutation time.

Then, the operation of the second switching signal generating circuit 30 will be described. Referring to FIG. 9A, the polarity signal Vsgn transmitted from the first switching signal generating circuit 18B and the polarity signal isgn denoting the polarity of the output current icc and transmitted from the current polarity discriminating circuit 19 are respectively supplied via the input terminals 334 and 335 before being supplied to the commutation mode selecting circuit 336. Since the commutation mode selecting circuit 336 is, as shown in FIG. 9B, constituted by the XOR circuits 350 to 353, the commutation mode selecting circuit 336 transmits high level signals Y5 to Y8 when the level cf the polarity signal Vsgn and that of isgn are the same (that is, the polarity of the output voltage Vcc from the cyclo-converter circuit 15 and that of the output current icc are the same). When the level of the polarity signal Vsgn and that of isgn are different from each other, low level signals Y5 and Y8 are transmitted from the same. Then, the switching signals T5q to T8q transmitted from the switching signal generating circuit 18B are supplied through the input terminals 330 and 333 before being supplied, together with the above-described signals Y5 to Y8, to the signal selecting circuits 337 to 340.

Now, the operation of the signal selecting circuit 337 will be described with reference to FIG. 9C. When the switching signal T5q supplied through the input terminal 330 is supplied to the shift register circuit 354 and the OR circuit 355, signal T5qA, which is the signal obtained by delaying only the last transition timing of the switching signal T5q by the commutation time or longer, is transmitted from the OR circuit 355. Then, a signal to be transmitted as the second switching signal T5p is selected between the above-described two signals T5q and T5qA in response to the signal Y5 transmitted from the commutation mode selecting circuit 336, the second switching signal T5p being transmitted from the NOT circuit 356, the AND circuits 357 and 358 and the OR circuit 359. Similarly, the second switching signals T6p to T8p are transmitted from the signal selecting circuits 338 to 340. Thus, the second switching signals T5p to T8p corresponding to the above-described commutation mode are transmitted from the output terminals 341 to 344.

Referring to FIG. 7, the above-described switching signals T5p to T8p are, together with the polarity signal isgn transmitted from the current polarity discriminating circuit 19, supplied to the cyclo-converter switching circuit 20. As a result, the ON/OFF signals T5 to T8 and T5A to T8A for the eight semiconductor switching devices S5 to S8 and S5A to S8A which constitute the cyclo-converter circuit 15 are transmitted. In response to the ON/OFF signals T5 to T8 and T5A to T8A, the switching devices S5 to S8 and S5A to S8A are switched on/off.

As a result of the above-described operation, the voltage Vcc, the waveform of which has been formed by modulating the pulse width of the AC reference voltage signal Vcc* transmitted from the reference voltage generating circuit 16, is transmitted from the cyclo-converter circuit 15. The high frequency component of the output voltage Vcc is removed by the filter circuit 4 connected to the output of the cyclo-converter circuit 15 before the voltage Vcc is supplied to the load circuit 13.

According to the second embodiment, the effect obtainable according to the first embodiment can be obtained. The structure is constituted in such a manner that the discrimination is made by switching signal generating circuit 30, whether or not the power source commutation of the semiconductor switching devices S5 to S8 and S5A to S8A which constitute the cyclo-converter circuit 15 can be performed. Furthermore, the second switching signal is transmitted in accordance with the result of the above-described discrimination. Therefore, the power source commutation of the switching devices S5 to S8 and S5A to S8A can be performed. As a result, the switching loss resulting when the operation is stopped can be reduced in comparison to that resulting according to the conventional forcible commutation system. Therefore, an efficient DC-to-AC electric power converting apparatus can be obtained.

According to the second embodiment, a structure having a carrier signal in the form of a sawtooth curve which is lowered to the right, is employed. However, the carrier signal may be in the form of a sawtooth curve which is raised to the right as described according to the first embodiment or in the form of a triangle. However, the switching device of the eight semiconductor switching devices constituting the cyclo-converter circuit 15 which can be subjected to the power source commutation becomes different depending upon the waveform of the carrier signal. Therefore, the structure of the commutation mode selecting circuit 336 included in the second switching signal generating circuit 30 must, of course, be changed depending upon the carrier signal.

According to the first embodiment, the structure is arranged in such a manner that the cyclo-converter switching circuit 20 makes a selection from the ON/OFF signal Tn and TnA (n=5 to 8) depending upon the polarity of the output current icc. Another structure may be employed which is arranged in such a manner that the current detector 5 and the current polarity discriminating circuit 19 are omitted and the ON/OFF signals Tn and TnA are made the same signal regardless of the polarity of the output current icc.

In the case where the DC-to-AC electric power converting apparatus according to the first and the second embodiments is applied to an uninterruptive power supply system or the like, the reference value of, for example, the AC load voltage supplied to the load circuit 13 is given as a command and the voltage obtained by amplifying the deviation between the actual AC load voltage detected and the reference value is supplied as the reference voltage signal Vcc*. Therefore, in this case, the reference voltage signal generating circuit 16, of course, comprises a reference signal generator for the AC load voltage to be supplied to the load circuit 13, a voltage detector for detecting the actual AC load voltage and an amplifier for amplifying the deviation between the above-described reference load voltage and the actual load voltage and generating the reference voltage signal Vcc*.

Figure 11:
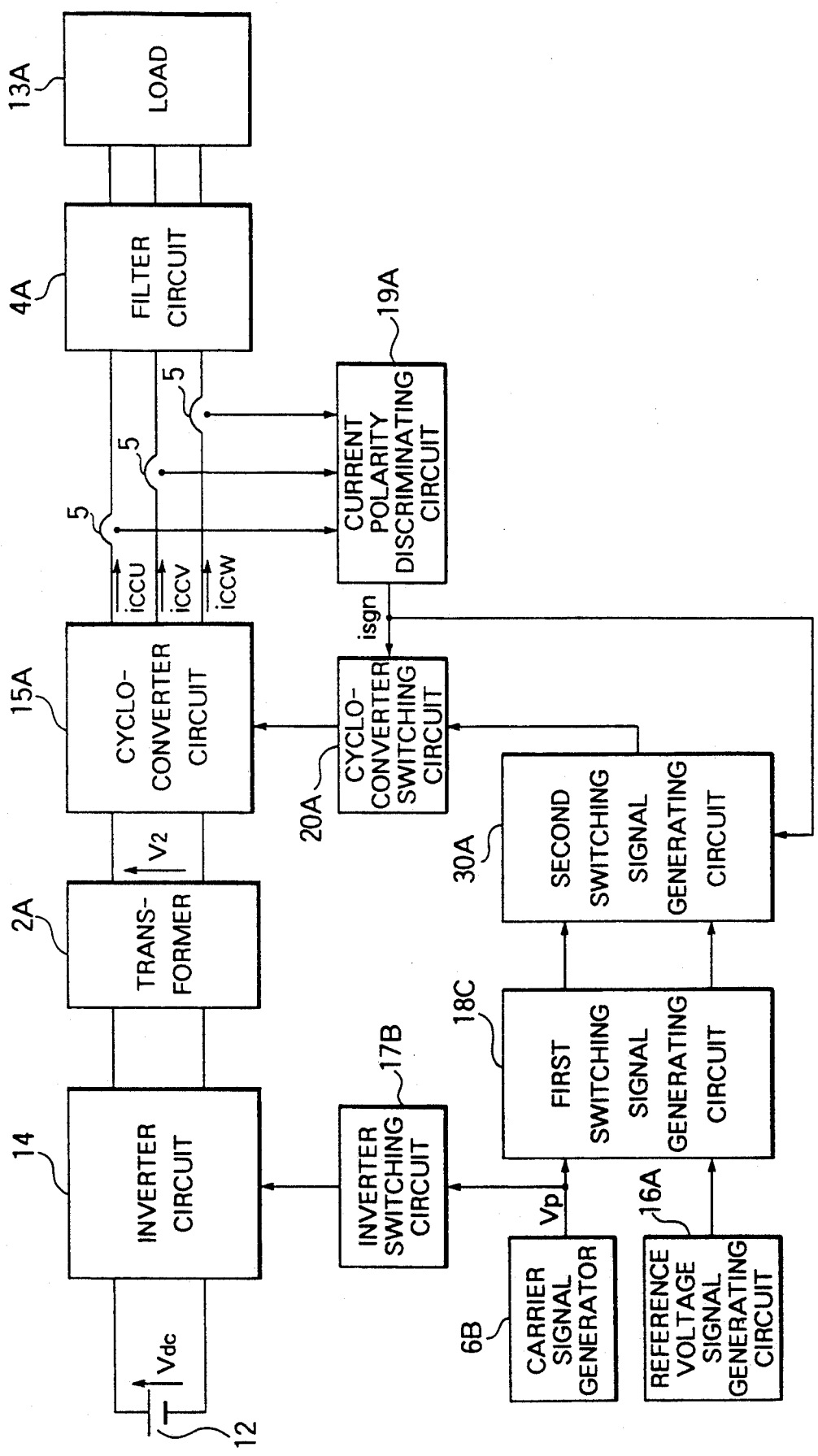
FIG. 11 is a block diagram which illustrates a third embodiment of the present invention.

Then, a third embodiment of the present invention will be described with reference to FIGS. 11 to 16. According to this embodiment, a three phase AC voltage is transmitted as an example of the cases in which a multi-phase AC output is obtained. FIG. 11 is a block diagram which illustrates the third embodiment. Referring to the drawing, reference numeral 4A represents a filter circuit, 15A represents a cyclo-converter circuit and 16A represents a reference voltage signal generating circuit. Reference numeral 18C represents a first switching signal generating circuit and 19A represents a current polarity discriminating circuit. Reference numeral 20A represents a cyclo-converter switching circuit, 30A represents a second switching signal generating circuit and 13A represents a three-phase load circuit connected to the above-described DC-to-AC electric power converting apparatus. The other elements are the same as the elements according to the second embodiment.

Figure 12:
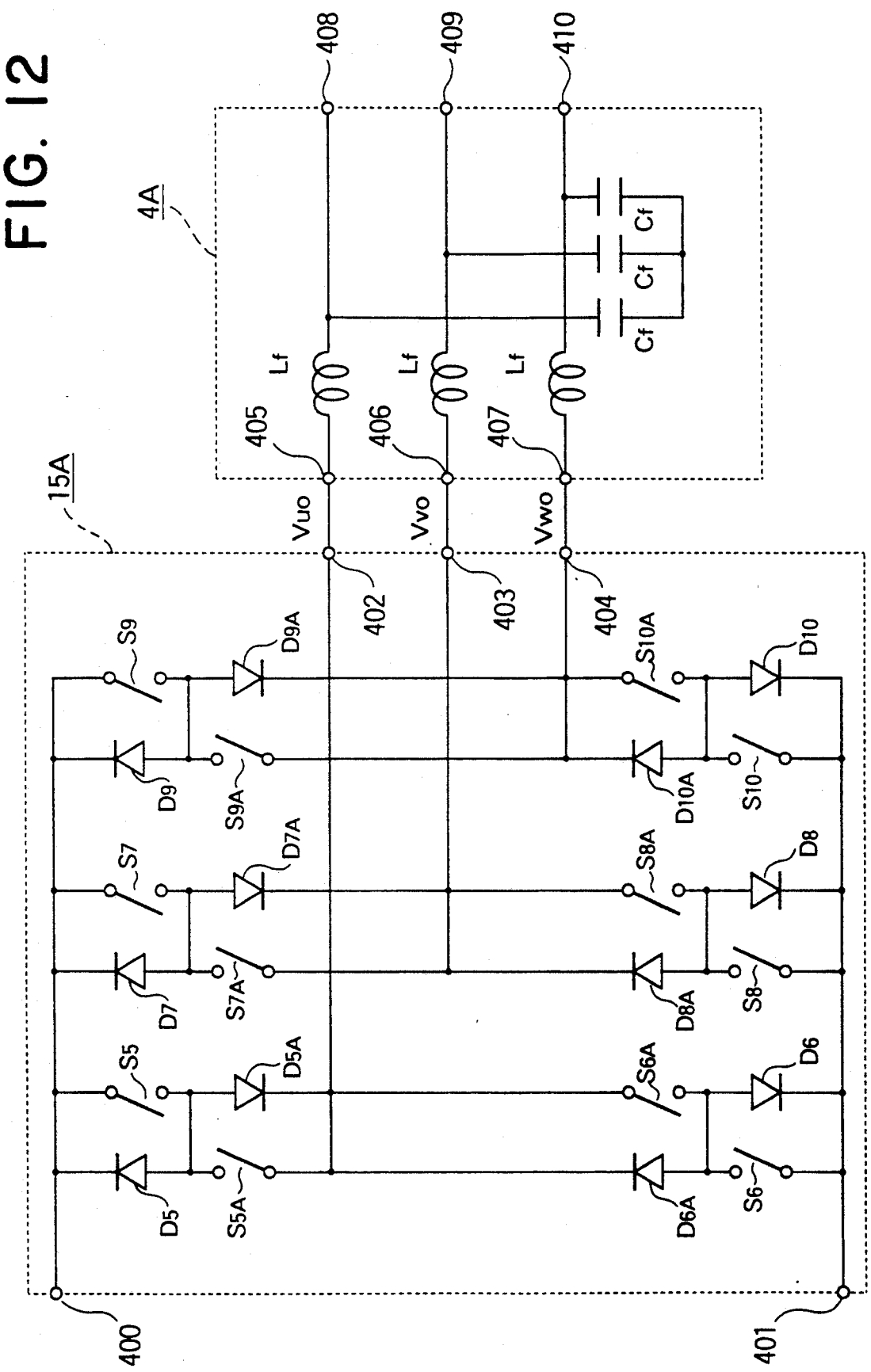
FIG. 12 is a block diagram which illustrates a cyclo-converter circuit and a filter circuit according to a third embodiment.

FIG. 12 illustrates the detailed structure of the cyclo-converter circuit 15A and that of the filter circuit 4A. The cyclo-converter circuit 15A comprises input terminals 400 and 401 connected to the secondary coil terminals 23 and 24 of the transformer 2A, semiconductor switching devices S5 to S10 and S5A to S10A such as transistors and MOSFETs, diodes D5 to D10 and D5A to D10A connected to the above-described switching devices S5 to S10 and S5A to S10A in an inverted parallel manner and output terminals 402 and 404 connected to the filter circuit 4A. The above-described two semiconductor switching devices Sn and SnA (n=5 to 10) and diodes Dn and DnA (n=5 to 10) connected to the two semiconductor switching devices Sn and SnA (n=5 to 10) constitute bidirectional switches each of which is arranged in such a manner that the direction, through which electric power is supplied, can be controlled.

The filter circuit 4A comprises input terminals 405 to 407 respectively connected to the output terminals 402 to 404 of the cyclo-converter circuit 15A, reactors LF and condensers CF and output terminals 408 to 410.

Figure 13:
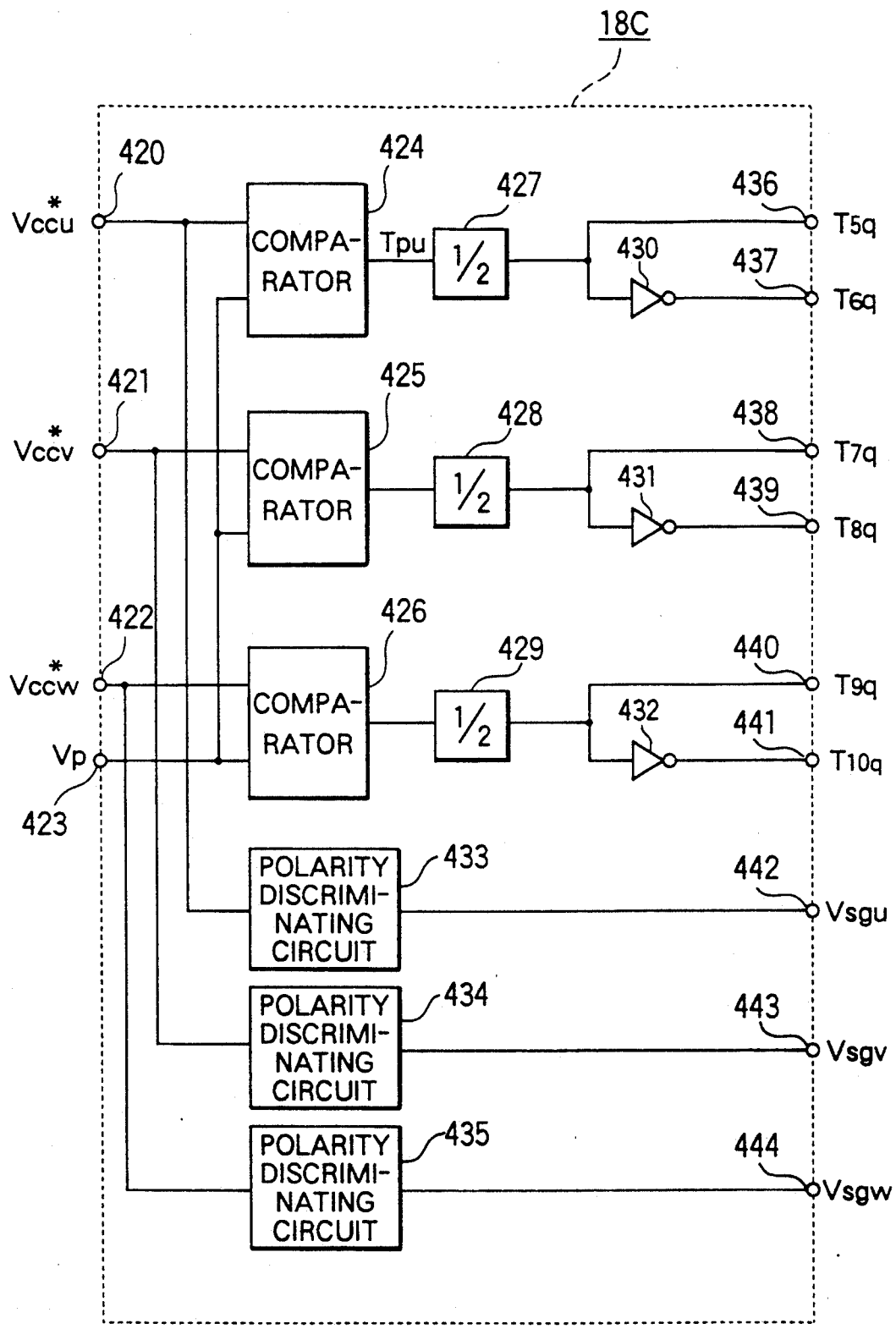
FIGS. 13 and 14 are block diagrams which respectively illustrate a first and a second switching signal generating circuits according to the third embodiment.

FIG. 13 illustrates the detailed structure of the first switching signal generating circuit 18C which comprises input terminals 420 to 422 connected to the reference voltage signal generating circuit 16A, an input terminal 423 connected to the carrier signal generator 6B, comparators 424 to 426, ½-dividers 427 to 429 the polarity of the output from which is inverted in synchronization with the first transition of the input signal, NOT circuits 430 to 432, polarity discriminating circuits 433 to 435 and output terminals 436 to 444.

Figure 14:
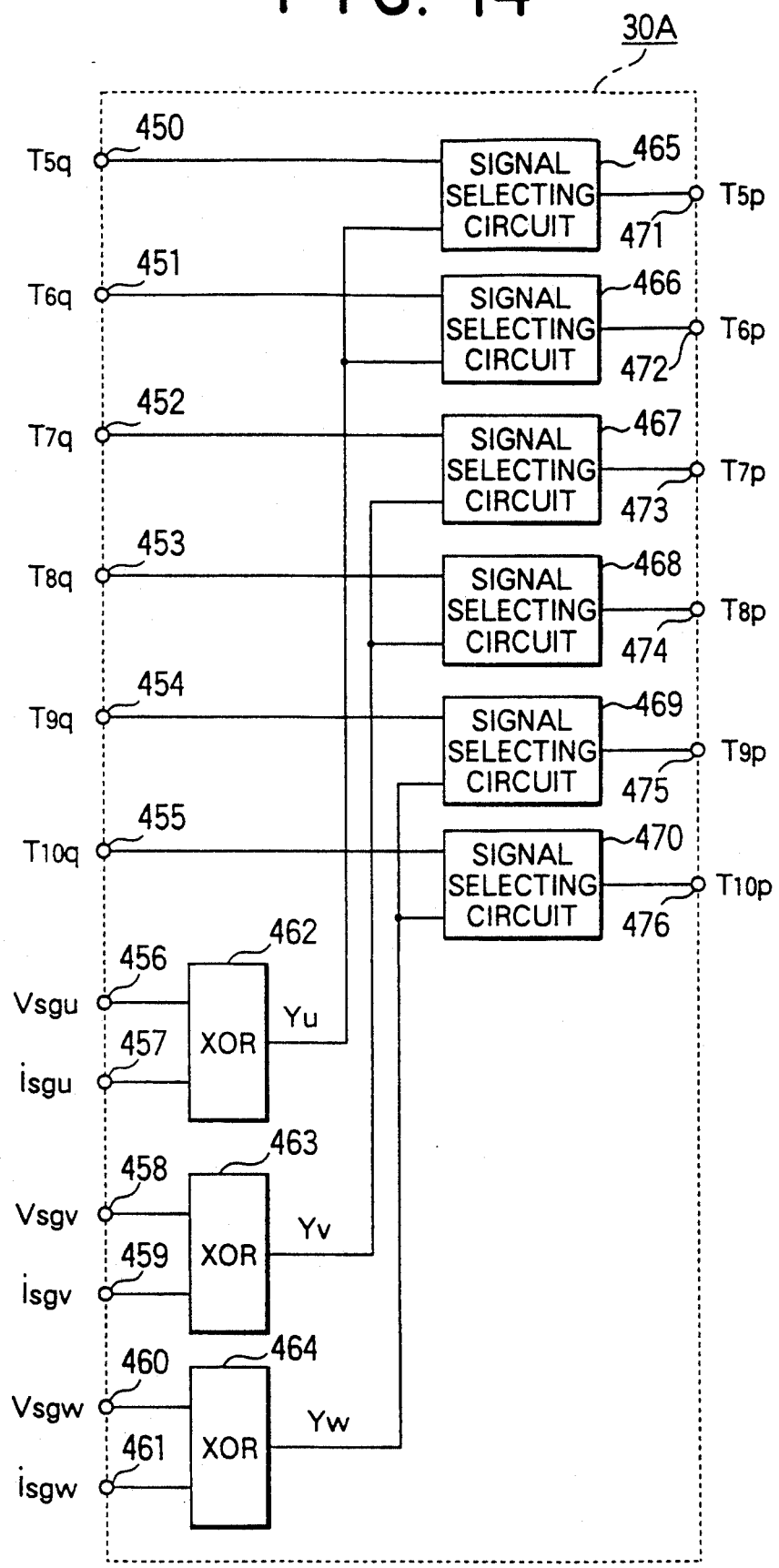

FIG. 14 illustrates the detailed structure of the second switching signal generating circuit 30A which comprises input terminals 450 to 455 connected to the output terminals 436 to 441 of the first switching signal generating circuit 18C, input terminals 456, 458 and 460 connected to the output terminals 442 to 444, input terminals 457, 459 and 461 connected to the current polarity discriminating circuit 19A, XOR (exclusive OR) circuits 462 to 464, signal selecting circuits 465 to 470 and output terminals 471 to 476.

Figure 15:
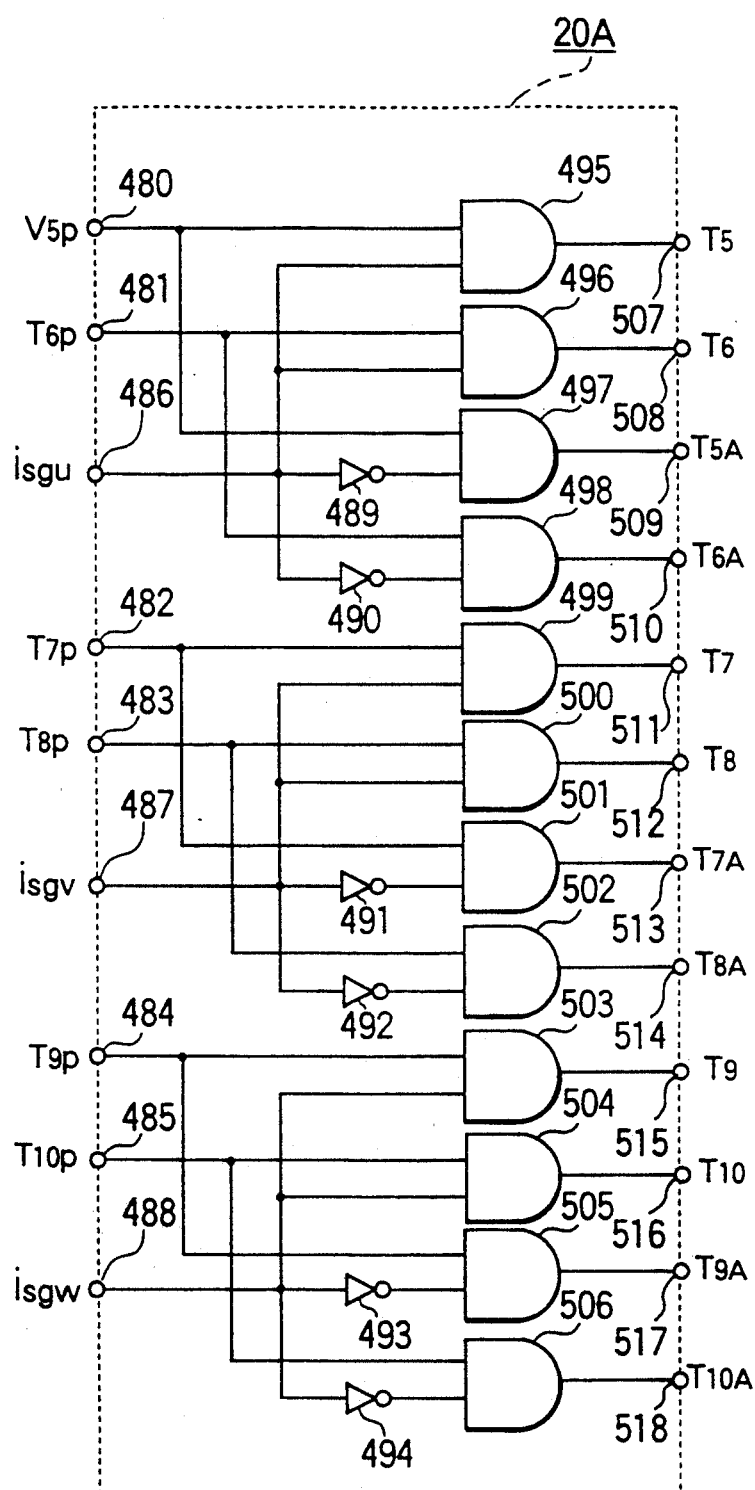
FIG. 15 is a block diagram which illustrates a cyclo-converter switching circuit according to the third embodiment.

FIG. 15 illustrates the detailed structure of the cyclo-converter switching circuit 20A which comprises input terminals 480 to 485 connected to the output terminals 471 to 476 of the second switching signal generating circuit 30A, input terminals 486 to 488 connected to the current polarity discriminating circuit 19A, NOT circuits 489 to 494, AND circuits 495 to 506 and output terminals 507 to 518.

Figure 16:
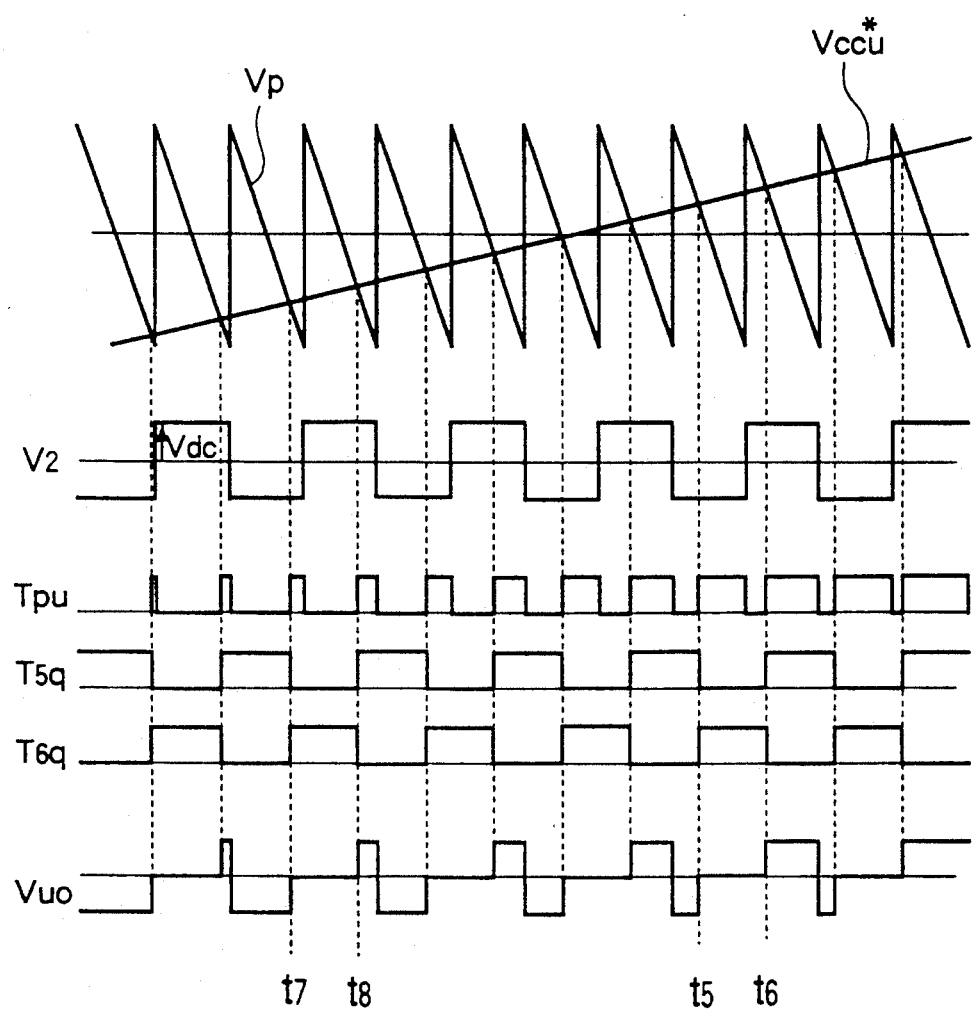
FIG. 16 is a timing chart which illustrates the operation of the third embodiment.
Figure 17:
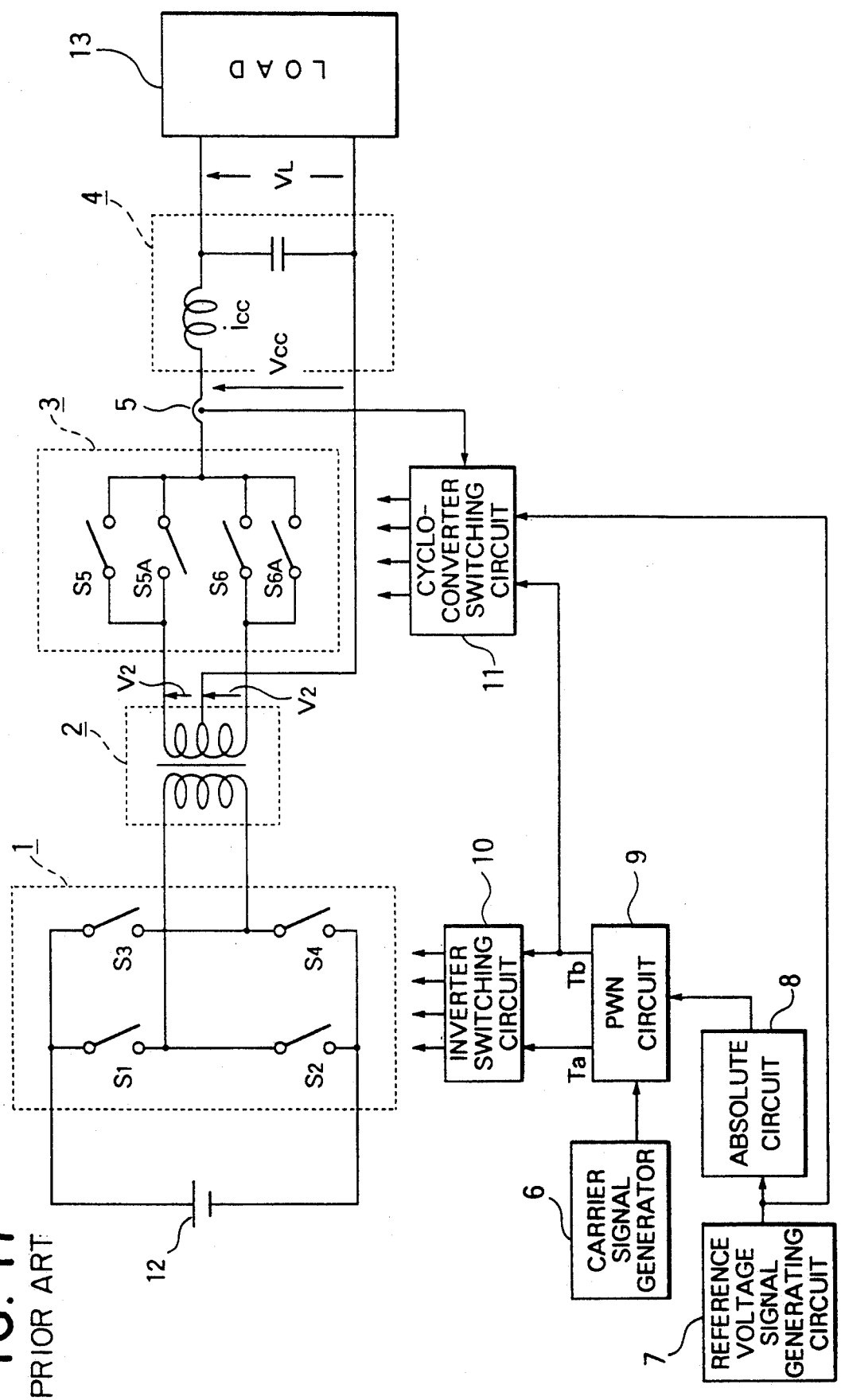
FIG. 17 is a block diagram which illustrates a conventional DC-to-AC electric power converting apparatus.
Figure 18:
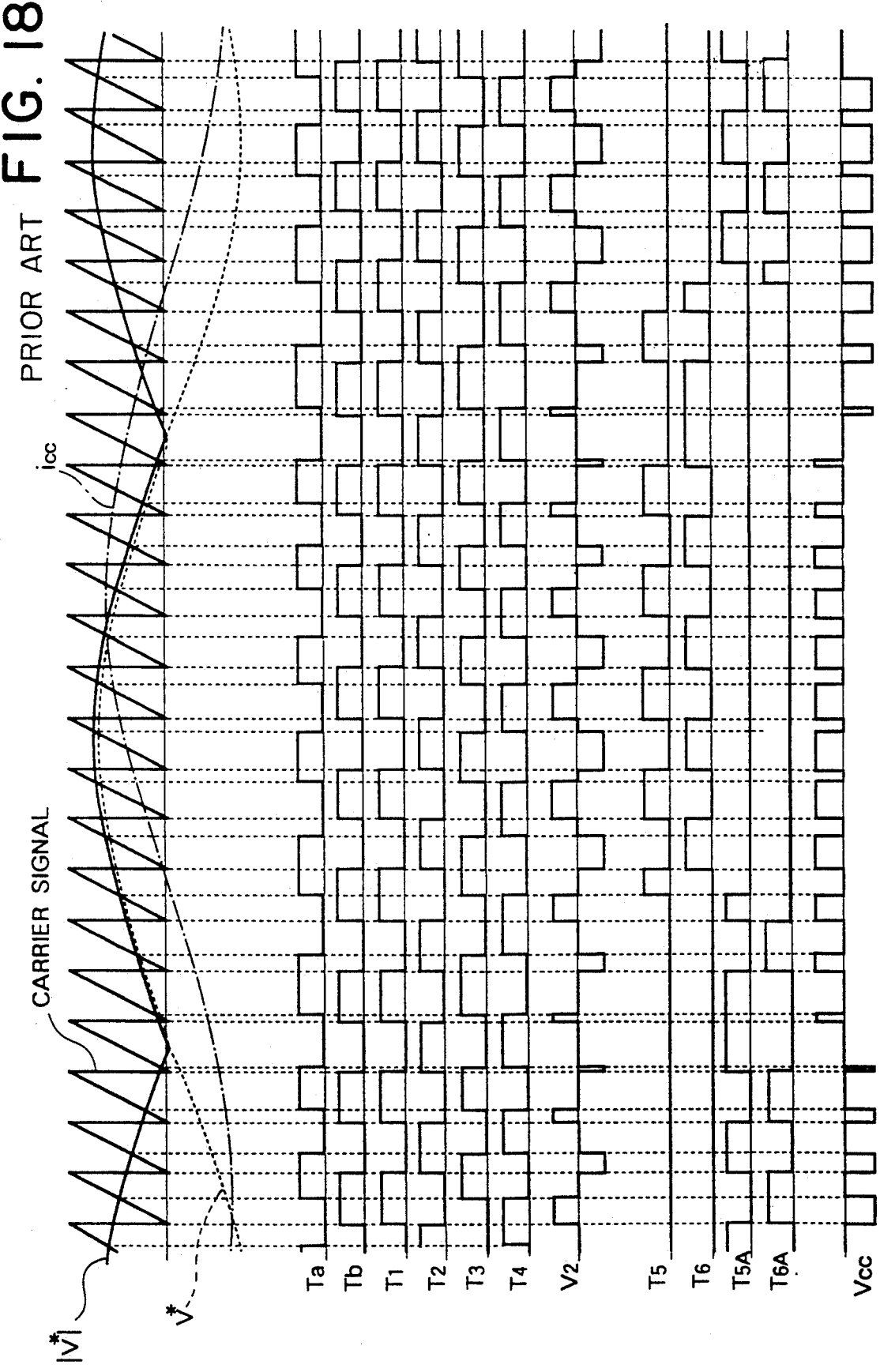
FIG. 18 is a timing chart which illustrates the operation of the DC-to-AC electric power converting apparatus shown in FIG. 17.

Now, the operation of the third embodiment will be described with reference to FIG. 16. First, the sawtooth shape carrier signal Vp which is lowered to the right as shown in the uppermost portion of FIG. 16 is transmitted from the carrier signal generator 6B. The carrier signal Vp is then supplied to the inverter switching circuit 17B so that the inverter switching circuit 17B transmits the ON/OFF signals T1 to T4. The four semiconductor switching devices S1 to S4 of the inverter circuit 14 are switched on/off in response to the ON/OFF signals T1 to T4. As a result, the secondary voltage V2 of the transformer 2A becomes a rectangular waveform voltage, the duty ratio of which is 50% as shown in FIG. 16. Since the above-described operation is the same as that according to the second embodiment, the detailed description is omitted here. Then, three-phase (phases, u, v and w) AC reference voltage signals Vccu*, Vccv* and Vccw* are transmitted from the reference voltage signal generating circuit 16A so as to be supplied, together with the carrier signal Vp, to the first switching signal generating circuit 18C.

Then, the operation of the four semiconductor switching devices S5, S6, S5A and S6A included in the cyclo-converter circuit 15A for controlling the voltage of the phase u will be described with reference to FIG. 16. Referring to FIG. 13, the u-phase reference voltage signal Vccu* supplied to the input terminal 420 of the first switching signal generating circuit 18C is, together with the carrier signal Vp supplied to the input terminal 423, supplied to the comparator 424. As a result, signal Tpu as shown in FIG. 16 is transmitted from the comparator 424. The signal Tpu is supplied to the ½-divider 427 so that the first switching signal T5q shown in FIG. 16 is transmitted through the output terminal 436. When the signal T5q is supplied to the NOT circuit 430, first switching signal T6q shown in FIG. 16 is transmitted through the output terminal 437. The polarity of Vccu* is discriminated by the polarity discriminating circuit 433 so as to be transmitted through the output terminal 442 as u-phase voltage polarity signal Vsgu.

The first switching signals T5q and T6q are, together with the polarity signal isgu for u-phase current iccu transmitted from the current polarity discriminating circuit 19A, supplied to the cyclo-converter switching circuit 20A as switching signals T5p and T6p through the second switching signal generating circuit 30A shown in FIG. 14. The cyclo-converter switching circuit 20A transmits the ON/OFF signals T5, T6, T5A and T6A in accordance with the relationship expressed by the following equations:
when the polarity of iccu is positive (when the level of isgu is high):

T5=T5p, T6=T6p

T5A and T6A are low level (S5A and S6A are "OFF")

when the polarity of iccu is negative (when the level of isgu is low)

T5A=T5p, T6A=T6p

T5 and T6 are low level (S5 and S6 are "OFF") (9)

However, it is assumed here that the polarity of iccu is defined to be positive when an electric current passes from the cyclo-converter circuit 15A to the filter 4A.

In response to the above-described ON/OFF signals T5, T6, T5A and T6A, the semiconductor switching devices S5, S6, S5A and S6A of the cyclo-converter circuit 15A shown in FIG. 12 are switched on/off. As a result, voltage Vuo the pulse width of which has been modulated as shown in the lowermost portion of FIG. 16 is transmitted through the output terminal 402. Since Vuo thus transmitted is the output voltage from the output terminal 402 to be supplied to the input terminal 401, the relationship Vuo=0 is held when the semiconductor switching device S6 or S6A is switched on.

Now, the commutation operation performed by the semiconductor devices S5, S6, S5A and S6A of the cyclo-converter circuit 15A will be described. First, a case, where both the polarity of the u-phase output voltage Vccu and that of the u-phase output current iccu of the cyclo-converter circuit 15A are positive, will be described, where the u-phase output voltage Vccu is the voltage of the output terminal 402 with respect to the voltage obtained by ⅓ times the output neutral voltage V0 of the cyclo-converter circuit 15A, that is, the sum of the potentials of the output terminals 402 to 404. That is, Vccu=Vu0−V0 however, Vo=(Vu0+Vv0+Vw0)/3 (10)

The basic wave component coincide with that of the u-phase reference voltage signal Vccu.

Since both the polarity of Vccu and that of iccu are positive, the semiconductor switching devices S5 and S6 are switched on/off in response to the first switching signals T5q and T6q due to the relationship expressed by Equation (9). Then, the commutation is performed among the above-described switching devices at times t5 and t6 shown in FIG. 16. That is, the commutation from the device S5 to S6 is performed at time t5, the commutation from the device S6 to S5 is performed at time t6. Then, the commutation from the switching device S5 to S6 at time t: will be described. As shown in FIG. 16, since the polarity of the secondary voltage V2 of the transformer 2A is negative at the time of the commutation, the switching device S5 is inversely biased when the device S6 is switched on as shown in FIG. 12. Therefore, it is apparent that the commutation of the power source can be performed. Similarly, it is apparent that the commutation of the power source can also be performed at other time t6.

Then, a case in which the polarity of the u-phase output voltage Vccu from the cyclo-converter circuit 15A is positive and the polarity of the u-phase output current iccu is negative will be described. In this case, the semiconductor switching devices S5A and S6A, are respectively switched on/off in response to the first switching signals T5q and T6q due to the relationship expressed by Equation (9). Then, the commutation is performed between the above-described switching devices S5A and S6A at times t7 and t8 shown in FIG. 16. That is, the commutation from the device S5A to S6A is performed at time t7, the commutation from the device S6A to S5A is performed at time t8. Then, the commutation from the switching device S5A to S6A at time t7 will be described. As shown in FIG. 16, since the polarity of the secondary voltage V2 of the transformer 2A is negative at the time of the commutation, the switching device S5A is forward biased when the device S6A is switched on as shown in FIG. 12. Therefore, it is apparent that the device S5A is not switched off and the commutation of the power source cannot be performed. Similarly, it is apparent that the commutation of the power source cannot be performed at other time t8.

Then, the case where the polarity of the u-phase output voltage Vccu is negative will be described. The commutation of the power source of the switching devices S5 and S6 (or S5A tc S6A) can be performed when the polarity of the u-phase output voltage Vccu and that of the u-phase output current iccu are the same. When the polarity is different from each other, the commutation of the power source cannot be performed.

In the case where the power source commutation is employed, the off-timing of the switching signal (the timing at which the signals T5q and T6q are changed from a high level to a low level with reference to FIG. 6) may be delayed by at least the commutation time as described according to the second embodiment.

Then, the operation of the second switching signal generating circuit 30A will be described. Referring to FIG. 14, the u-phase voltage polarity signal Vsgu transmitted from the first switching signal generating circuit 18C and the polarity signal isgu for the u-phase output current iccu of the cyclo-converter circuit 15A transmitted from the current polarity discriminating circuit 19A are supplied to the XOR circuit 462 via the input terminals 456 and 457. The XOR circuit 462 transmits the signal Yu of a high level when the level of the polarity signal Vsgu and that of isgu are the same (that is, the polarity of the u-phase output voltage Vccu of the cyclo-converter 15A and that of the output current iccu are the same). On the other hand, the XOR circuit 462 transmits the Yu signal of a low level when the level of the polarity signal Vsgu and that of isgu are different from each other. Then, the switching signals T5q and T6q transmitted from the first switching signal generating circuit 18C are supplied via the input terminals 450 and 451 so as to be supplied, together with the signal Yu, to the signal selecting circuits 465 and 466. In response to this, the second switching signals T5p and T6p which correspond to the commutation mode are transmitted from the signal selecting circuits 465 and 466 though the output terminals 471 and 472. Since the structure and the operation of each of the signal selecting circuits 465 and 466 are the same as those according to the second embodiment (see FIG. 9C), the description is omitted here.

The second switching signals T5p and T6p are, together with the polarity signal isgu of the u-phase output current iccu transmitted from the current polarity discriminating circuit 19A, supplied to the cyclo-converter switching circuit 20A via the input terminals 480, 481 and 486. As a result, the ON/OFF signals T5, T6, T5A and T6A for the four semiconductor switching devices S5, S6, S5A and S6A of the cyclo-converter circuit 15A are transmitted through the output terminals 507 to 510 in accordance with the relationship expressed by Equation (9). As a result, the switching devices S5, S6, S5A and S6A are switched on/off.

The voltage of the phase v and that of the phase w are similarly controlled. That is, when v-phase reference voltage signal Vccv* and the w-phase reference voltage signal Vccw* transmitted from the reference voltage signal generating circuit 16A are supplied to the first switching signal generating circuit 18C shown in FIG. 13 via the input terminals 421 and 422, first switching signals T7q to T10q are respectively transmitted through the output terminals 438 to 441. Furthermore, v-phase voltage polarity signal Vsgv and w-phase voltage polarity signal Vsgw are transmitted from the output terminals 443 and 444. Then, the first switching signals T7q to T10q and the voltage polarity signals Vsgv and Vsgw are, together with the polarity signals isgv and isgw for the v-phase output current iccv and the w-phase output current iccw transmitted from the current polarity discriminating circuit 19A, supplied to the input terminals 452 to 455 and 458 to 461 of the second switching signal generating circuit 30A shown in FIG. 14. Similarly to the case of the u-phase, the second switching signals T7p to T10p corresponding to the commutation mode are transmitted from the output terminals 473 to 476. The second switching signals T7p to T10p are, together with the polarity signals isgv and isgw transmitted from the current polarity discriminating circuit 19A, supplied to the input terminals 482 to 485, 487 and 488 of the cyclo-converter switching circuit 20A shown in FIG. 15. As a result, the ON/OFF signals T7 to T10 and T7A to T10A for the semiconductor switching devices S7 to S10 and S7A to S10A of the cyclo-converter circuit 15A are transmitted from the output terminals 511 to 518 of the cyclo-converter switching circuit 20A. In response to the thus transmitted ON/OFF signals T7 to T10 and T7A to T10A, the switching devices S7 to S10 and S7A and S10A are switched on/off.

As a result of the above-described operation, the three-phase AC voltages Vccu, Vccv and Vccw each of the pulse width of which has been modulated in response to the three-phase AC reference voltage signals Vccu*, Vccv* and Vccw* transmitted from the reference voltage signal generating circuit 16A are transmitted from the cyclo-converter circuit 15A. The high frequency component of each of the three-phase AC voltage Vccu, Vccv and Vccw is removed by a three-phase filter circuit 4A connected to the output of the cyclo-converter circuit 15A before the three-phase AC voltage Vccu, Vccv and Vccw are supplied to the three-phase load 13A.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A DC-to-AC electric power converting apparatus comprising:
    an inverter circuit for converting DC voltage into an AC voltage;
    a transformer connected to said inverter circuit;
    a cyclo-converter circuit for converting frequency of an output from said transformer to provide a converted AC voltage;
    a carrier signal generator for generating a carrier signal of a predetermined frequency;
    an inverter switching circuit in synchronization with the carrier signal;
    a reference voltage signal generating circuit for generating a reference signal for the converted AC voltage transmitted from said cyclo-converter circuit;
    a first switching signal generating circuit for generating switching signals in accordance with the reference voltage signal supplied from said reference voltage signal generating circuit and the carrier signal supplied from said carrier signal generator, including means for pulse width modulating the reference voltage signal;
    a cyclo-converter switching circuit for generating a signal for controlling said cyclo-converter circuit in accordance with the switching signals supplied from said first switching signal generating circuit;
    a current detector for detecting an output current from said cyclo-converter circuit; and
    a current polarity discriminating circuit for discriminating polarity of the output current from said cyclo-converter circuit detected by said current detector, said cyclo-converter switching circuit transmitting a signal for controlling said cyclo-converter circuit in accordance with the switching signals supplied from said first switching signal generating circuit and an output from said current polarity discriminating circuit.

2. An apparatus according to claim 1, wherein said cyclo-converter circuit includes a plurality of semiconductor switching devices, said first switching signal generating circuit transmitting a plurality of switching signals corresponding to said plurality of semiconductor switching devices of said cyclo-converter circuit, the pulse width of each switching signal having been modulated.

3. An apparatus according to claim 1 further comprising a filter circuit for removing a high frequency component from the output of said cyclo-converter circuit.

4. An apparatus according to claim 1, wherein said inverter switching circuit transmits a control signal the duty ratio of which is 50%.

5. An apparatus according to claim 1, wherein each of said cyclo-converter circuit, said reference voltage signal generating circuit, said first switching signal generating circuit and said cyclo-converter switching circuit is constituted by a circuit in the form of a multi-phase structure.

6. A DC-to-AC electric power converting apparatus comprising:
   an inverter circuit for converting a DC voltage into an AC voltage;
   a transformer connected to said inverter circuit;
   a cyclo-converter circuit including a plurality of semiconductor switching devices for converting frequency of an output from said transformer to provide a converted AC voltage;
   a carrier signal generator for generating a carrier signal of a predetermined frequency;
   an inverter switching circuit in synchronization with the carrier signal;
   a reference voltage signal generating circuit for generating a reference signal for the converted AC voltage transmitted from said cyclo-converter circuit;
   a first switching signal generating circuit for generating switching signals in accordance with the reference voltage signal supplied from said reference voltage signal generating circuit and the carrier signal supplied from said carrier signal generator, the switching signals corresponding to said plurality of semiconductor switching devices of said cyclo-converter circuit, the pulse width of each switching signal being modulated;
   a cyclo-converter switching circuit for generating a signal for controlling said cyclo-converter circuit in accordance with the switching signals supplied from said first switching signal generating circuit; and
   a second switching signal generating circuit which receives the switching signals supplied from said first switching signal generating circuit, discriminates whether or not power source commutation of each of said semiconductor switching devices included in said cyclo-converter circuit can be performed, and transmits the switching signals which correspond to semiconductor switching devices which cannot be commutated to said cyclo-converter switching circuit.

7. An apparatus according to claim 6, wherein said cyclo-converter circuit includes a plurality of semiconductor switching devices, said first switching signal generating circuit transmitting a plurality of switching signals corresponding to said plurality of semiconductor switching devices of said cyclo-converter circuit.

8. An apparatus according to claim 6 further comprising a filter circuit for removing a high frequency component from the output of said cyclo-converter circuit.

9. An apparatus according to claim 6, wherein said inverter switching circuit transmits a control signal having a duty ratio of 50%.

* * * * *